US006413607B1

(12) United States Patent
Kasada et al.

(10) Patent No.: US 6,413,607 B1
(45) Date of Patent: Jul. 2, 2002

(54) CYANINE DYES

(75) Inventors: Chiaki Kasada; Yoshie Hata; Toshio Kawata; Shigeo Yasui, all of Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 0 days.

(21) Appl. No.: 09/701,869

(22) PCT Filed: Apr. 11, 2000

(86) PCT No.: PCT/JP00/02349

§ 371 (c)(1),
(2), (4) Date: Dec. 5, 2000

(87) PCT Pub. No.: WO00/61687

PCT Pub. Date: Oct. 19, 2000

(30) Foreign Application Priority Data

Apr. 13, 1999 (JP) ............................................. 11/105332
Oct. 22, 1999 (JP) ............................................. 11/300515
Mar. 23, 2000 (JP) ............................................ 2000/81541

(51) Int. Cl.$^7$ ................................................. B32B 3/02
(52) U.S. Cl. ................ 428/64.1; 428/64.8; 430/270.14; 430/270.21
(58) Field of Search ............................... 428/64.1, 64.4, 428/64.8, 913; 430/270.14, 270.18, 270.21; 367/283, 288

(56) References Cited

U.S. PATENT DOCUMENTS 5,976,658 A * 11/1999 Tomizawa .................. 428/64.1
6,306,478 B1 * 10/2001 Chen ......................... 428/64.1

* cited by examiner

Primary Examiner—Elizabeth Evans
(74) Attorney, Agent, or Firm—Browdy and Neimark

(57) ABSTRACT

The present invention provides organic dye compounds which exert excellent recording characteristics in high-density optical recording media, and uses thereof. The present invention solves the objects of the present invention by providing non-symmetric trimethine cyanine dyes having a specific structure and properties, light absorbents and optical recording media comprising the cyanine dyes, and a process for preparing the cyanine dye comprising a step of reacting either 3,3-dimethyl-5-nitroindolium compounds or 3,3-dimethyl-5-sulfonamideindolium compounds, which have a reactive methyl group or an appropriate leaving group, with 3,3-dimethylbezoindolium compounds, which have a reactive methyl group or an appropriate leaving group.

23 Claims, 3 Drawing Sheets

CYANINE DYES

The present application is the national stage under 35 U.S.C. 371 of PCT/JP00/02349, filed Apr. 11, 2000.

TECHNICAL FIELD

The present invention relates to cyanine dyes, and more particularly, to non-symmetric trimethine cyanine dyes which exert excellent recording characteristics when used in high-density optical recording media.

BACKGROUND ART

As coming into this multi-media age, optical recording media such as compact disc recordable (CD-R, a write-once memory using compact disc), and digital versatile disc (DVD-R, a write-once memory using digital video disc), have been highlighted. optical recording media can be classified roughly into those of inorganic ablation type which have recording layers composed of inorganic substances such as tellurium, selenium, rhodium, carbon, or carbon sulfide; and those of organic ablation type which have recording layers composed of light absorbents containing organic dye compounds as main ingredients.

Among these, optical recording media of organic ablation type are usually prepared by dissolving a cyanine dye in an organic solvent such as 2,2,3,3-tetrafluoro-1-propanol (abbreviated as "TFP" hereinafter), coating the solution on the surface of a polycarbonate substrate, drying the solution to form a recording layer, forming (i) a reflection layer made of a metal such as gold, silver or copper (ii) and a protection layer made of an ultraviolet ray hardening resin on the surface of the recording layer, and successively attaching the above layers (i) and (ii) on the surface of the recording layer. When compared with inorganic ablation type optical recording media, those of organic ablation type have the drawback that their recording layers may be easily changed by environmental lights such as reading- and natural-lights. Organic ablation type optical recording media, however, have the merit that they can be manufactured at a lesser cost because their recording layers can be formed by preparing solutions of light absorbents and directly coating the solutions on the surface of substrates. Organic ablation type optical recording media have now become predominantly low-cost optical recording media because they are mainly composed of organic substances so that they are substantially free of corrosion even when contacted with moisture or sea water and because information, which is stored in optical recording media, can be read by using compact disc players by the establishment of thermal deformation type optical recording media which are a kind of organic ablation type optical recording medium.

What is urgently required in organic ablation type optical recording media is to more increase their recording capacity to suit to this multi-media age. The research for such an increment, which is now being eagerly continued in this field, is to shorten the wavelength of 775–795 nm, that is irradiated by conventional GaAlAs semiconductor lasers, to a wavelength of 660 nm or shorter in order to increase the recording capacity per one side to a level of 4.7 giga bytes (GB) or more. However, since most of conventional cyanine dyes explored for CD-Rs could not appropriately write and read information using a laser beam with a wavelength of 660 nm or shorter when used in high-density optical recording media such as DVD-Rs, the cyanine dyes now used could not fulfil the need for high-storage densification required in many fields.

As another causative for spoiling the high-storage densification of organic ablation type optical recording media, there exist problems of the thermal decomposition and the heat resistance of dyes. In organic ablation type optical recording media, pits are formed by using heat generated when dyes absorb laser beam and then melt and decompose. However, the difference between the melting point and the decomposition point of most of conventional cyanine dyes is quite large and their thermal difference is quite high; the pit formation by laser beam is not sharp or uniform, and the heat of melting and decomposition will conduct to area around the irradiated points and then distort the previously-formed adjacent pits. In addition, most of conventional cyanine dyes have a rather lower decomposition point, and this results in the problem that the part around the pits and other pit-less part on the recording surface may be easily deformed by the accumulated heat which is generated when the dyes are exposed to a reading laser-beam for a relatively-long period of time because the cyanine dyes have a relatively-low heat resistance.

OBJECT OF THE INVENTION

In view of the foregoing, the object of the present invention is to provide an organic dye compound which exerts excellent recording characteristics when used in high-density optical recording media, and to provide uses thereof.

To attain the above object, the present inventors eagerly studied and screened compounds. As a result, they found that non-symmetric cyanine dyes (may be called "cyanine dyes" hereinafter) obtainable through a step of reacting either 3,3-dimethyl-5-nitroindolium compounds or 3,3-dimethyl-5-sulfonamideindolium compounds bearing a reactive methyl group or an appropriate leaving group, with 3,3-dimethylbezoindolium compounds bearing a reactive methyl group or an appropriate leaving group, have absorption maxima in the visible region, and substantially absorb a visible light with a wavelength around 650 nm when in a thin layer form. They also found that, unlike conventional related compounds, most of the cyanine dyes of the present invention have the following features: They have only decomposition points or decomposition points undistinguishable from their melting points, have significantly-higher decomposition points and heat resistance than those of conventional related compounds, and promptly decompose at temperatures around their decomposition points. The present inventors confirmed that the cyanine dyes form minute pits stably on the recording surfaces promptly and at a relatively-high density when irradiated with a laser beam at a wavelength around 650 nm in optical recording media. The present invention was made based on the creation of novel organic dye compounds and the discovery of their industrially-useful characteristics.

BRIEF EXPLANATION OF THE ACCOMPANYING DRAWINGS

BEST MODE OF THE INVENTION

Figure 1:
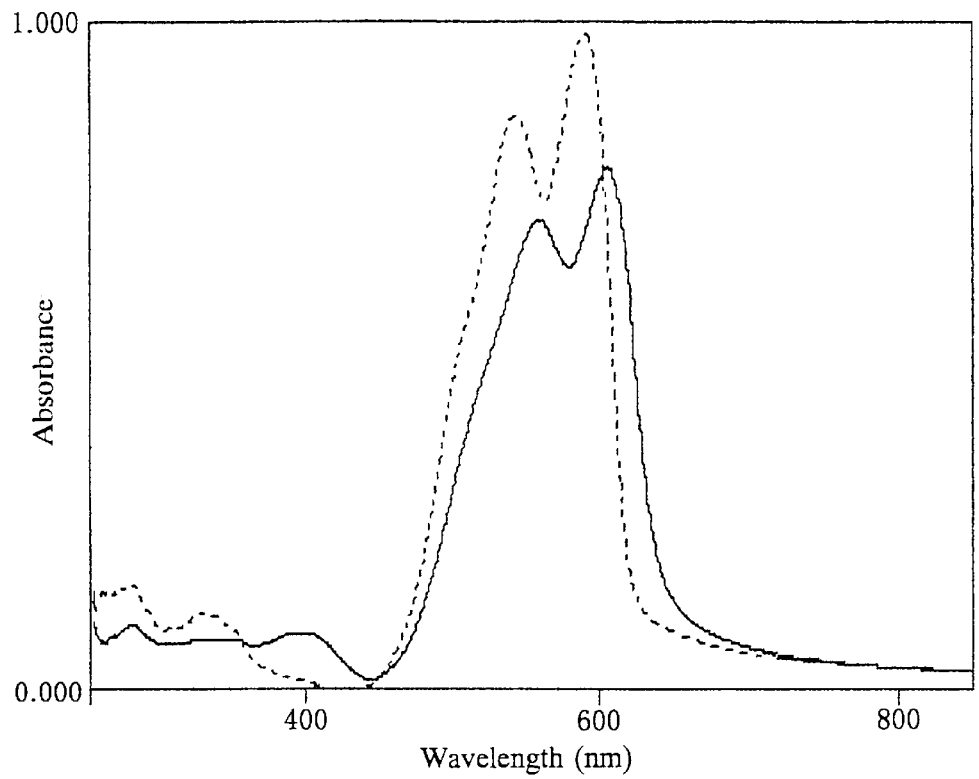
FIG. 1 shows visible absorption spectra of the cyanine dye of the present invention and a conventional related compound.

The present invention solves the above object by providing the cyanine dyes represented by Formula 1 or 2, and more particularly, by providing cyanine dyes which substantially absorb a visible light with a wavelength around 650 nm when in a thin layer form, and have only decomposition points or decomposition points undistinguishable from their melting points.

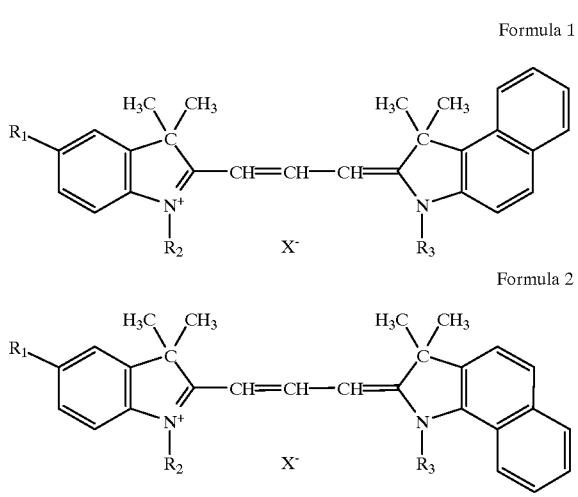

Formula 1

Formula 2

Throughout Formulae 1 and 2, $R_1$ denotes a nitro group or a sulfonamide group which either or both of the hydrogen atoms may be replaced with a lower alkyl group, which has a straight-chain, branched-chain, or cyclic structure, such as methyl, ethyl, propyl, isopropyl, butyl, isobutyl, sec-butyl, tert-butyl, pentyl, isopentyl, neopentyl, tert-pentyl, cyclopentyl, 1-methylpentyl, 2-methylpentyl, hexyl, isohexyl, cyclohexyl, or 5-methylhexyl group; or which may form a heterocycle such as pyrrolidine, piperidine, piperazine, pyrazolidine, imidazoline, or morpholine ring while keeping the nitrogen atom in the sulfonamide group.

$R_2$ and $R_3$ independently denote alkenyl group, aralkyl group, or alkyl group having a straight-chain or branched-chain. These alkenyl, aralkyl, and alkyl groups may have one or more substituents. Examples of the alkenyl group in $R_2$ and $R_3$ are vinyl, 1-propenyl, 2-propenyl (or allyl), isopropenyl, 2-butenyl, 1,3-butadienyl, and 2-pentenyl groups, which may have one or more substituents such as halogens including fluorine, chlorine, bromine, and iodine; alkoxy or haloalkoxy groups such as methoxy, trifluoromethoxy, ethoxy, propoxy, butoxy, and tert-butoxy groups; alkoxycarbonyl groups such as methoxycarbonyl and ethoxycarbonyl groups; and other substituents of cyano, nitro, carboxy, sulfonyl, amide, and hydroxy groups.

Examples of the aralkyl group in $R_2$ and $R_3$ are those which have methylene groups of up to five, usually, from 1 to 3, and either end of which binds to a monocyclic or polycyclic saturated or unsaturated hydrocarbon group or heterocyclic group such as phenyl, biphenyl, o-tolyl, m-tolyl, p-tolyl, o-cumenyl, m-cumenyl, p-cumenyl, xylyl, mesityl, styryl, cinnamoyl, naphthyl, anthracenyl, anthraquinolyl, carbazolyl, 2-pyridyl, 2-quinolyl, 2-tetrahydropyranyl, 2,2-dimethyl-1,3-dioxolane-4-yl, 1,3-dioxolane-2-yl, 3,5-dimethyl-isoxazole-4-yl, 3-piperidinyl, piperidino, morphorino, 1-piperadinyl, pyrrolidine-1-yl, 1-methyl-2-pyrrolidinyl, 2-benzimidazole, phthalimide-1-yl, 5-uracil, or benzotriazole-1-yl group. These hydrocarbon groups and heterocyclic groups may contain one or more of the substituents similarly as above alkenyl groups such as halogens, alkoxy group, haloalkoxy group, alkoxycarbonyl group, cyano group, nitro group, carboxy group, sulfonyl group, amide group, and hydroxy group; and lower alkyl or haloalkyl groups having a straight-chain, branched-chain, or cyclic structure such as methyl, trifluoromethyl, ethyl, propyl, isopropyl, butyl, isobutyl, sec-butyl, tert-butyl, pentyl, isopentyl, neopentyl, tert-pentyl, cyclopentyl, 1-methylpentyl, 2-methylpentyl, hexyl, isohexyl, cyclohexyl, and 5-methylhexyl groups.

The alkyl group in $R_2$ and $R_3$ includes the following groups having a straight- or branched-chain, usually, those which contain carbon atoms of up to 12, and preferably from 1 to 8; methyl, ethyl, propyl, isopropyl, butyl, isobutyl, sec-butyl, tert-butyl, 1-methylbutyl, 2-methylbutyl, 3-methylbutyl, pentyl, isopentyl, neopentyl, tert-pentyl, 1-methylpentyl, 2-methylpentyl, 5-methylpentyl, hexyl, isohexyl, heptyl, and octyl groups, which may have one or more substituents. Examples of such substituents are those similarly as in the above alkenyl group; halogens, alkoxy group, haloalkoxy group, alkoxycarbonyl group, cyano group, nitro group, carboxy group, sulfonyl group, amide group, and hydroxy group; and aromatic hydrocarbon groups such as phenyl, biphenyl, o-tolyl, m-tolyl, p-tolyl, o-cumenyl, m-cumenyl, p-cumenyl, xylyl, mesityl, styryl, cinnamoyl, and naphthyl groups. Preferably, $R_2$ and $R_3$ are alkyl groups, which are identical or different, represented by $C_mH_{2m+1}$ and $C_nH_{2n+1}$, where n and m are natural numbers and counted not more than seven in total. The cyanine dyes with these alkyl groups can be processed into excellent light absorbents because they have only decomposition points or decomposition points undistinguishable from their melting points, and promptly decompose at around their decomposition points.

Throughout Formulae 1 and 2, $X^-$ denotes a counter ion, and there exists no $X^-$ when $R_2$ and/or $R_3$ have a negatively charged substituent that forms an internal salt. It may be changed depending on use, the counter ion can be appropriately selected in view of the solubility of the cyanine dyes in organic solvents and the stability of the cyanine dyes in recording layers, and usually, selected from inorganic acid anions such as fluoric , chloric, bromic, iodic, perchloric, periodic, phosphoric acid, phosphoric acid hexafluoride, antimony hexafluoride, tin acid hexafluoride, fluoroboric acid, and tetrafluoroborate ions; organic acid anions such as thiocyanic acid, benzenesulfonic acid, naphthalenesulfonic acid, p-toluenesulfonic acid, alkylsulfonic acid, benzenecarboxylic acid, alkylcarboxylic acid, trihaloalkylcarboxylic acid, alkylsulfonic acid, trihaloalkylsulfonic acid, and nicotinic acid ions; and organic metal complex anions such as those of azo, bisphenyldithiol, thiocatecholchelate, thiobisphenolatechelate, bisdiol-α-diketone, and their related compounds. In the cyanine dyes represented by Formulae 1 and 2, any types of cyanine dyes can be included in the present invention independently of their cis and trans forms. Depending on final use, $R_1$ is preferably a nitro group.

Concrete examples of the present cyanine dyes are those represented by Chemical Formulae 1 to 28, which all have absorption maximum spectra in the visible region and substantially absorb a visible light with a wavelength around 650 nm when in a thin layer form. Most of the cyanine dyes have only decomposition points or decomposition points undistinguishable from their melting points, have higher decomposition points, and promptly decompose at around their decomposition points. The cyanine dyes can be advantageously used as light absorbents for high-density optical recording media such as DVD-Rs, etc., which use a laser beam with a wavelength of 630–680 nm as a writing light.

Chemical Formula 1
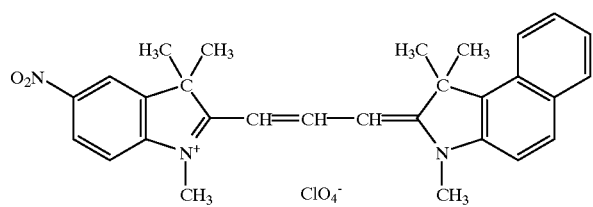
Chemical Formula 2
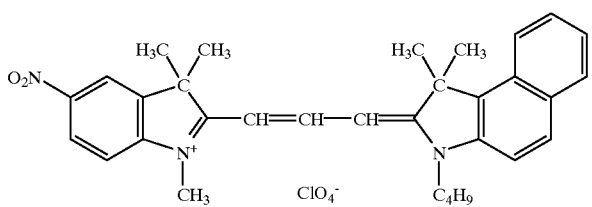
Formula 3
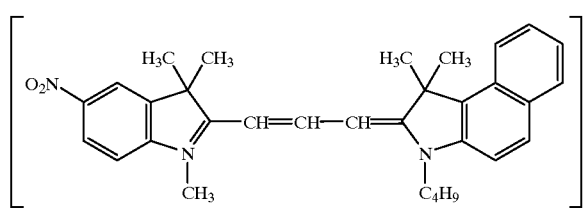
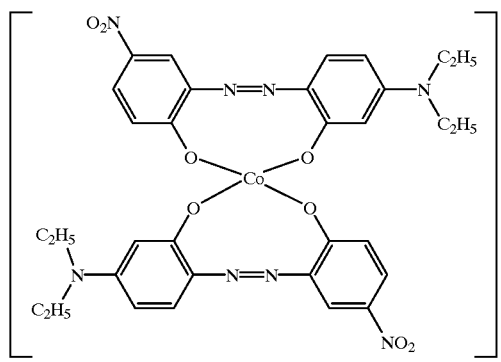
Formula 4
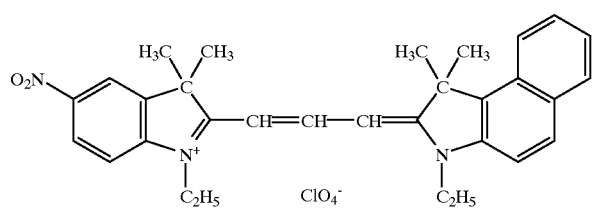
Formula 5
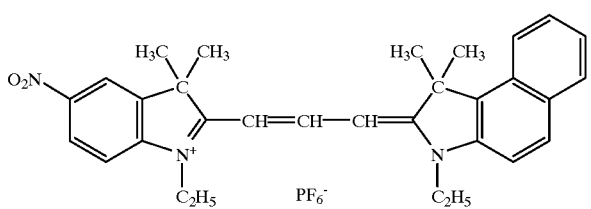
Formula 6
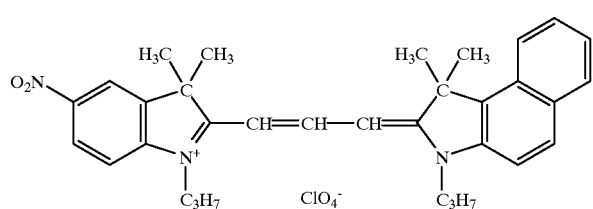
Chemical Formula 7
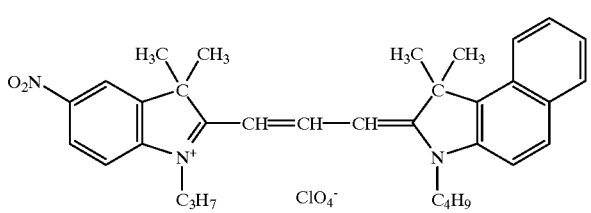
Chemical Formula 8
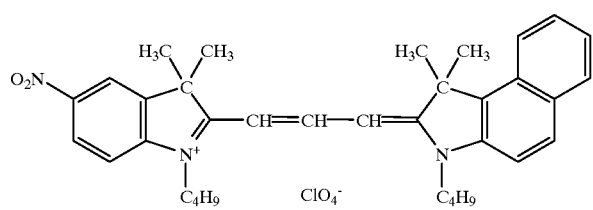
Chemical Formula 9
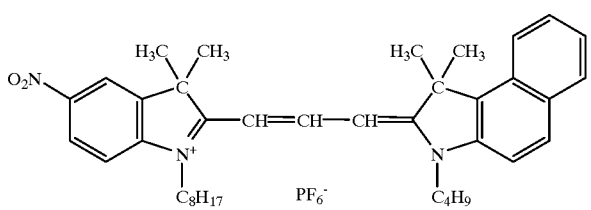
Chemical Formula 10
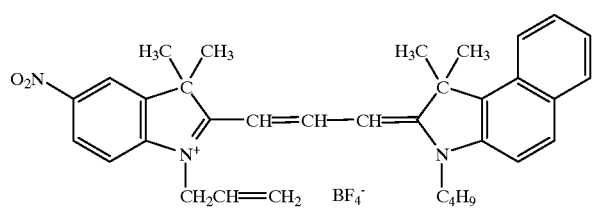
Chemical Formula 11
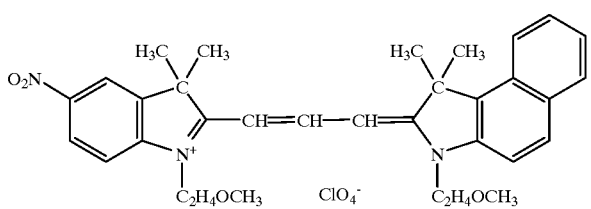

-continued
Chemical Formula 12
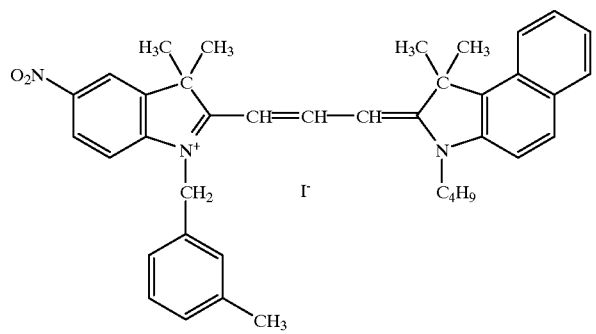
Chemical Formula 13
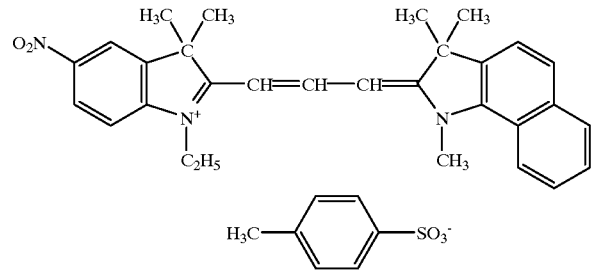
Chemical Formula 14
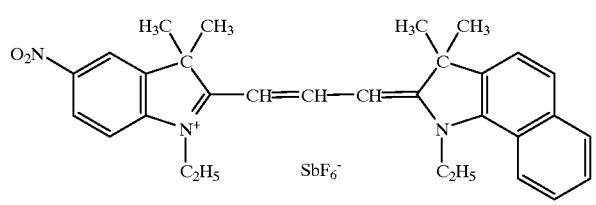
Chemical Formula 15
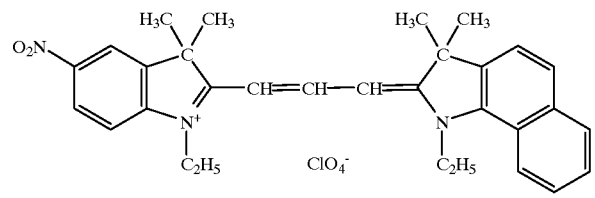
Chemical Formula 16
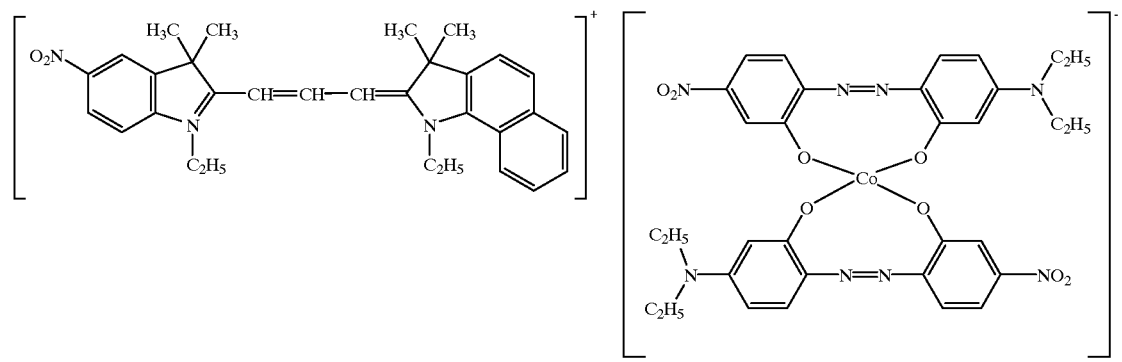
Chemical Formula 17
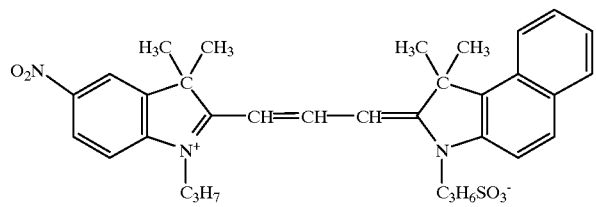
Chemical Formula 18
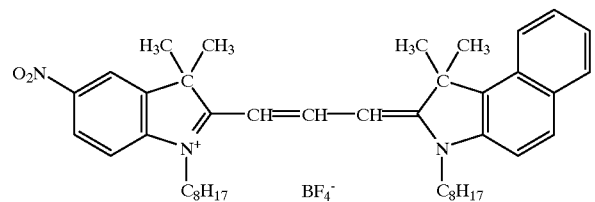
Chemical Formula 19
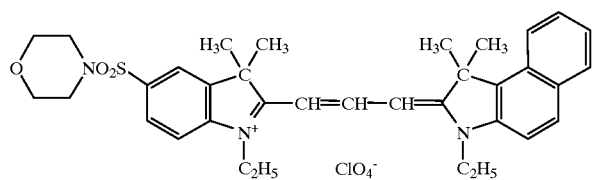
Chemical Formula 20
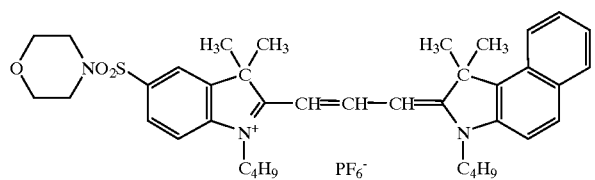

-continued
Chemical Formula 21
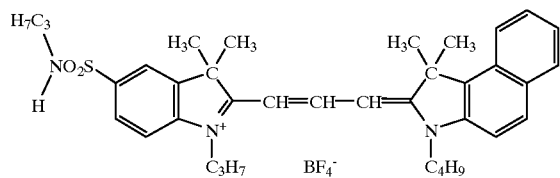
Chemical Formula 22
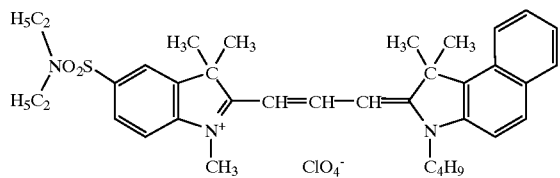
Chemical Formula 23
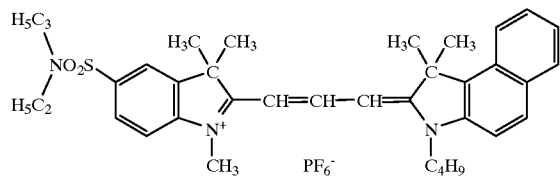
Chemical Formula 24
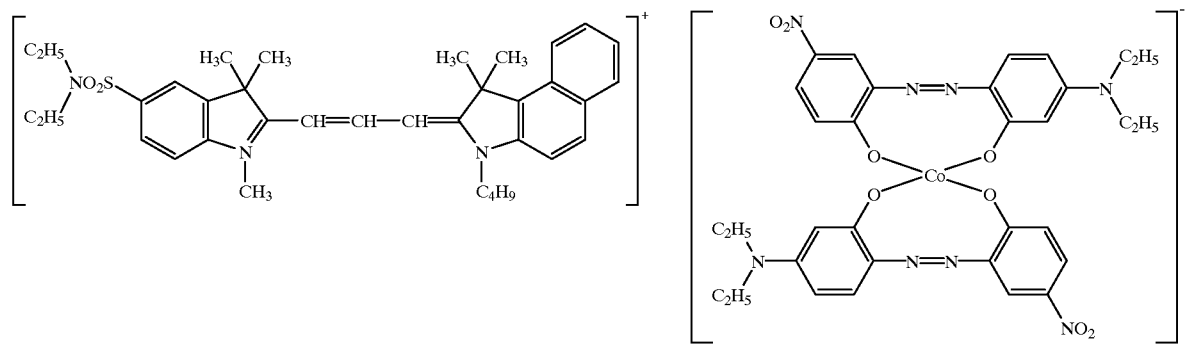
Chemical Formula 25
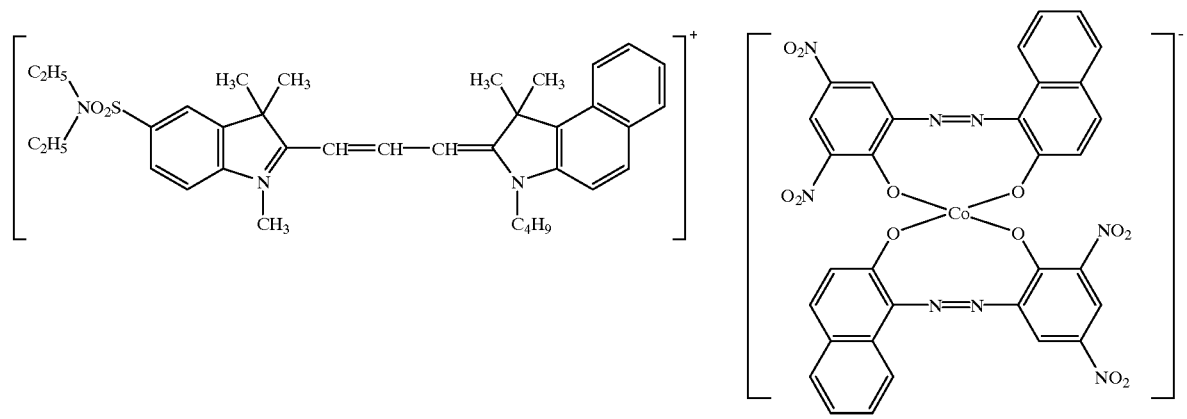

-continued

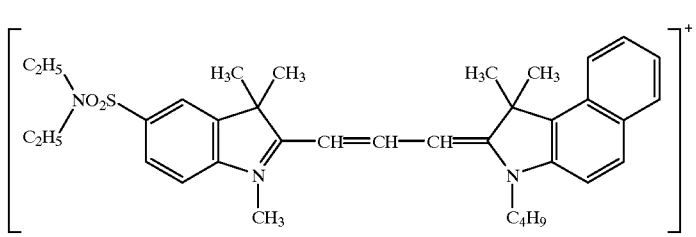

Chemical Formula 26

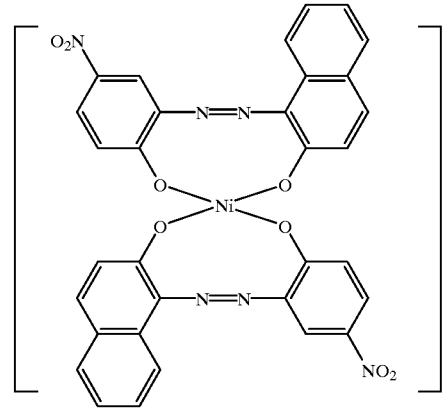

Chemical Formula 27

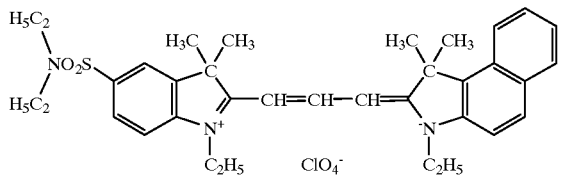

Chemical Formula 28

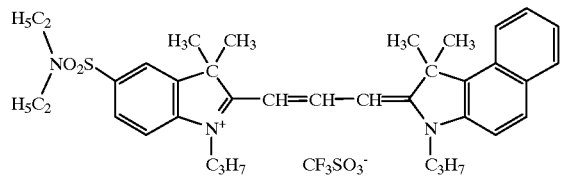

Although the cyanine dyes according to the present invention can be prepared by various methods, they can be advantageously prepared through a step of reacting either 3,3-dimethyl-5-nitroindolium compounds or 3,3-dimethyl-5-sulfonamideindolium compounds, which have a reactive methyl group or an appropriate leaving group, with 3,3-dimethylbezoindolium compounds, which have a reactive methyl group or an appropriate leaving group. With the method, the cyanine dyes of the present invention can be produced in a desired yield by reacting a compound, represented by Formula 3, which has $R_1$ and $R_2$ as shown in Formulae 1 and 2, with a compound represented by Formula 4 or 5 which has $R_3$ as shown in Formula 1 or 2; or reacting a compound, represented by Formula 6, which has $R_1$ and $R_2$ as shown on Formula 1 or 2, with a compound represented by Formula 7 or 8 which has $R_3$ as shown in Formula 1 or 2.

Formula 3

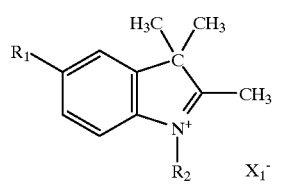

Formula 4

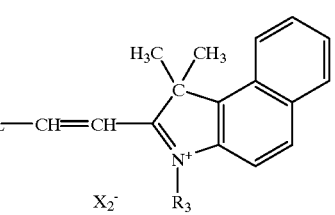

-continued

Formula 5

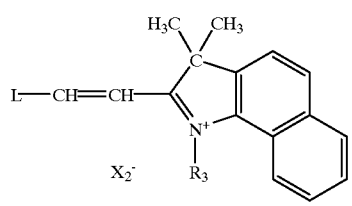

Formula 6

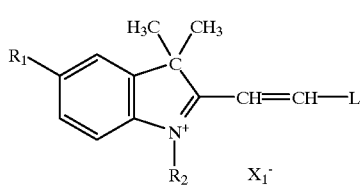

Formula 7

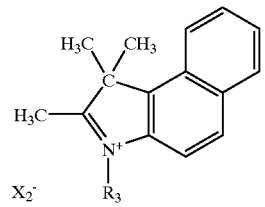

Formula 8

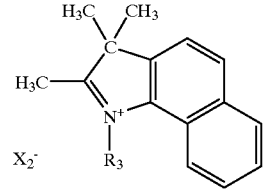

For example, adequate amounts of the compound represented by Formula 3 and the compound represented by Formula 4 or 5 are provided, or adequate amounts of the compound represented by Formula 6 and the compound represented by Formula 7 or 8 are provided; and the resulting mixture is dissolved in a solvent such as acetic acid, acetic anhydride, propionic acid anhydride, methanol, ethanol, propanol, isopropanol, cresol, benzyl alcohol, methyl cellosolve, ethyl cellosolve, acetone, acetonitrile, 1,4-dioxane, tetrahydrofuran, tetrahydropyran, formamide, N-methylformamide, N,N-dimethyl formamide, N-methylpyrrolidone, dimethylsulfoxide, water, or mixtures thereof, and then reacted for 0.5–5 hours under heating and stirring conditions, if necessary, in the presence of a basic compound such as sodium acetate, potassium acetate, potassium carbonate, calcium carbonate, triethylamine, N,N-dimethylaniline, piperidine, morpholine, pyridine, or 1,8-diazabicyclo[5.4.0]-7-undecene. Thereafter, the cyanine dyes with desired counter ions according to the present invention can be obtained from the above reaction mixture directly or after treated with conventional counter ion-exchange reaction. All the cyanine dyes represented by Chemical Formulae 1 to 28 can be prepared by the method in a desired yield. The compounds represented by Formulae 3 to 8 can be obtained in accordance with the method as disclosed in Japanese Patent Kokai No. 316,655/98 applied for by the same applicant as the present invention. In Formulae 3 to 8, $X_1^-$ and $X_2^-$ are identically or differently suitable counter ions, and L is an appropriate leaving group which is usually selected from monovalent groups of aniline or derivatives thereof such as anilino, p-toluidino, p-methoxyanilino, p-ethoxycarbonylanilino, and N-acetylanilino groups.

The cyanine dyes thus obtained can be used in the form of an intact reaction mixture or used after purified by the methods generally applied for their related compounds; dissolution extraction, separation, decantation, filtration, concentration, thin-layer chromatography, column chromatography, gas chromatography, high-performance liquid chromatography, distillation, crystallization, and sublimation. If necessary, these methods can be used in combination. For use as light absorbents in high-density optical recording media such as DVD-Rs, etc., the cyanine dyes should preferably be distilled, crystallized, and/or sublimated prior to use.

Explaining the use of the cyanine dyes of the present invention, they have absorption maxima in the visible region as mentioned above and substantially absorb a visible light with a wavelength around 650 nm, and particularly a laser beam with a wavelength of 630–680 nm, when in a thin layer form. Unlike conventional related compounds, the cyanine dyes of the present invention have decomposition points, i.e., temperatures that the weight of the cyanine dyes as test specimens begin to lower on thermogravimetric analysis, which are closely adjacent, i.e., usually within 10° C. or narrower, to their melting points, i.e., temperatures that the cyanine dyes as test specimens start to absorb heat; have only decomposition points or decomposition points undistinguishable from their melting points; have extremely-high decomposition points of 260° C. or higher, and preferably 270–300° C.; and promptly decompose at around the decomposition points. Accordingly, the cyanine dyes of the present invention have a variety of uses in many fields including optical recording media, photopolymerization, solar batteries, dyes, etc. Particularly, they can be quite advantageously used as light absorbents, which are sensitive to a laser beam with a wavelength around 650 nm, in high-density optical recording media such as DVD-Rs, etc., which use laser beam to write and read information.

In particular, unlike conventional related compounds, when the cyanine dyes are used in high-density optical recording media such as DVD-Rs, only the cyanine dyes positioning at the irradiated points promptly decompose and form prescribed pits without deforming the previously-formed pits nearness to the newly-formed pits by the conduction of the heat of fusion and decomposition to the part around the irradiated points. Accordingly, minute pits can be quite easily formed regularly and at a relatively-high density on a restricted recording surface of the optical recording media. Cyanine dyes with a relatively-low melting points and decomposition points have the demerit that they easily deform the part around the pits, which are previously-formed on the recording surface, and other pit-less part by the accumulated heat generated when optical recording media are irradiated by reading light to read information for a relatively-long period of time, while most of the present cyanine dyes scarcely cause such a problem because of their relatively-high decomposition points. Furthermore, most of the cyanine dyes of the present invention dissolve without any actual problem in polar organic solvents, which are commonly used in the field of optical recording media, such as TFP, and this easily increases the product yield and the working efficiency for coating cyanine dyes over the substrates of optical recording media, and maintains the product quality and property at a relatively-high level.

Explaining the use of the cyanine dyes of the present invention with reference to their application to organic ablation type optical recording media, the cyanine dyes can be used for preparing optical recording media in accordance with the processes for conventional ones because they do not require any special treatment and technique. For example, as light absorbents, one or more of the cyanine dyes of the present invention can be mixed with one or more other organic cyanine dyes, or with one or more commercialized light-resistant improves, binders, dispersing agents, flame retardants, lubricants, antistatic agents, surfactants, and plasticizers to control the reflection percentage and the light absorption percentage in recording layers, if necessary. Thereafter, the resulting mixtures are then dissolved in organic solvents, and the solutions are homogeneously coated over either surface of substrates in such a manner of spraying, soaking, roller coating, or rotatory coating method; and dried to form thin layers as recording layers made of light absorbents, and if necessary, followed by forming reflection layers to be closely attached on the recording layers by means of vacuum deposition, chemical vapor deposition, sputtering, or ion-planting method using metals and alloys such as gold, silver, copper, platinum, aluminum, cobalt, tin, nickel, iron, and chromium to impart a reflection efficiency of 45% or more, and preferably 55% or more; forming reflection layers closely attached on the recording layers by using commonly used materials for organic reflection layers; or coating over the recording layers ultraviolet ray hardening resins or thermosetting resins, which contain flame retardants, stabilizers or antistatic agents, to protect the recording layers from scratches, dusts, stains, etc., and then hardening the coatings by either irradiating light or heating to form protection layers closely attached on the reflection layers. Thereafter, if necessary, two plates of substrates with recording layers or reflection- and recording-layers are attached together by facing their protection layers using, for example, adhesives or viscous sheets; or attached with protection plates, which are the same materials and shapes as their substrates, over their protection layers.

Other organic dye compounds usable in combination with the cyanine dyes of the present invention are not specifically restricted as long as they are sensitive to the visible light and capable of controlling the light reflection ratio or the optical absorption ratio of optical recording media by combining with the cyanine dyes of the present invention. Examples of such organic dye compounds are polymethine dyes such as cyanine, merocyanine, oxanol, styryl, azulenium, squallilium, pyrylium, thiopyrylium, and phenanthrene dyes, which have a monomethine, trimethine, pentamethine, or heptamethine chain that may contain one or more substituents, and which bind identically or differently the following cyclic cores at their both ends: Rings of imidazoline, imidazole, benzimidazole, α-naphthoimidazole, β-naphthoimidazole, benzimidazole, indole, isoindole, indolenine, isoindolenine, benzindolenine, pyridinoindolenine, oxazoline, oxazole, isoxazole, benzoxazole, pyridineoxazole, α-naphthoxazole, β-naphthoxazole, selenazoline, selenazole, benzoselenazole, α-naphthoselenazole, β-naphthoselenazole, thiazoline, thiazole, isothiazole, benzothiazole, α-naphthothiazole, β-naphthothiazole, tellulazoline, tellulazole, benzotellulazole, α-naphthotellulazole, β-naphthotellulazole, aquaridine, anthracene, isoquinoline, isopyrrole, imidaquinoxaline, indandione, indazole, indoline, oxadiazole, carbazole, xanthene, quinazoline, quinoxaline, quinoline, chroman, cyclohexanedione, cyclopentanedione, cinnoline, thiodiazole, thiooxazolidone, thiophene, thionaphthene, thiobarbituric acid, thiohydantoin, tetrazole, triazine, naphthalene, naphthyridine, piperazine, pyrazine, pyrazole, pyrazoline, pyrazolidine, pyrozolone, pyran, pyridine, pyridazine, pyrimidine, pyrylium, pyrrolidine, pyrroline, pyrrole, phenazine, phenanthridine, phenanthrene, phenanthroline, phthalazine, pteridine, furazan, furan, purine, benzene, benzoxazine, benzopyran, morpholine, and rhodanine. In addition, the following organic dye compounds can be mentioned; acridine, azaannulene, azo metal complex, anthraquinone, indigo, indanthrene, oxazine, xanthene, dioxazine, thiazine, thioindigo, tetrapyraporphyradine, triphenylmethane, triphenothiazine, napthoquinone, phthalocyanine, benzoquinone, benzopyran, benzofuranone, porphyrin, rhodamine dyes, and their related dyes. Depending on use, these dyes can be appropriately used in combination. Preferable organic dye compounds usable in combination with the cyanine dyes of the present invention are those which have absorption maxima in the visible region, and particularly at a wavelength of 400–850 nm when in a thin layer form.

The light-resistant improvers used in the present invention are, for example, nitroso compounds such as nitrosodiphenylamine, nitrosoaniline, nitrosophenol, and nitrosonaphthol; and metal complexes such as 7,7,8,8-tetracyano-p-quinodimethane compounds, diimmonium salts, "NKX-1199" (bis[2'-chloro-3-methoxy-4-(2-methoxyethoxy)dithiobenzyl]nickel)produced by Hayashibara Biochemical Laboratories, Inc., Okayama, Japan, formazane metal complexes, and azo metal complexes, which all can be appropriately used in combination, if necessary. Preferable light-resistant improvers are those which contain nitroso compounds or formazane metal complexes, and most preferable ones are nitroso compounds which have a phenylpyridylamine skeleton as disclosed in Japanese Patent Application No. 88,983/99, titled "Phenylpyridylamine derivatives" applied for by the same applicant as the present invention, and others which contain metal complexes comprising one or more formazane compounds as ligands and metals such as nickel, zinc, cobalt, iron, copper, palladium, etc. When used in combination with such light-resistant improvers, the cyanine dyes of the present invention can be effectively prevented from undesirable changings in deterioration, fading, color change, and quality change, which are inducible by the exposure of reading- and environmental-lights, without lowering the solubility of the cyanine dyes in organic solvents and substantially deteriorating preferable optical characteristics. As a composition ratio, 0.01–10 moles, and preferably 0.05–5 moles of a light-resistant improver(s) can be incorporated into one mole of the present cyanine dye(s) while increasing and decreasing the ratio.

The light-resistant improvers should not necessarily exist separately from the cyanine dyes of the present invention, and if necessary, they can be formulated into salts, complexes, or compounds, which are composed along with the cyanine dyes of the present invention and commonly used organic metal complex anions, capable of improving the light resistance, such as those of azo, bisphenyldithiol, phenylbisdiol, thiocatecholchelate, thiobisphenolatechelate, or bisdithiol-α-diketone by using appropriate spacers and crosslinking agents such as alkoxides or cyarates of metal elements, for example, titanium, zirconium, aluminum, etc. Preferable ones are azo organic-metal-complex-anions, and examples of such are those represented by Formulae 9 to 12.

Formula 9

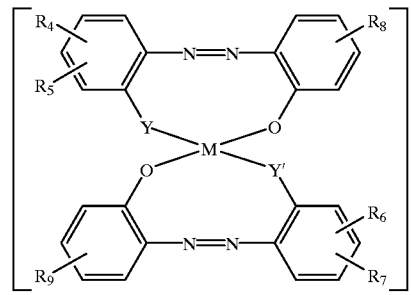

Formula 10

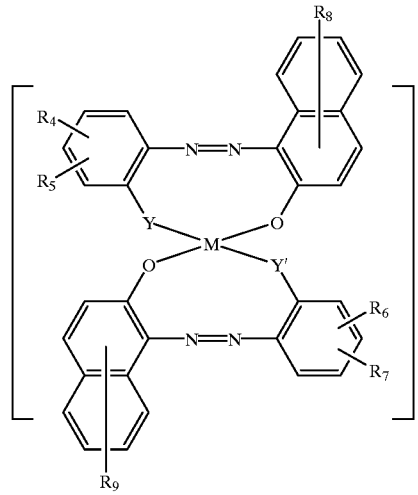

-continued

Formula 11

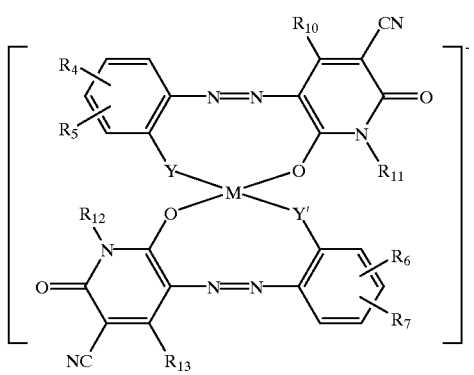

Formula 12

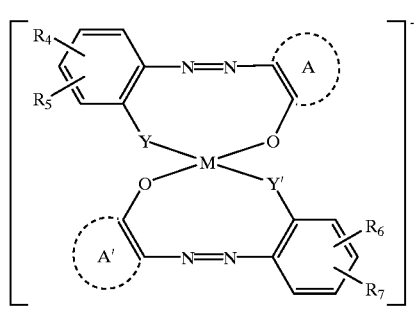

Throughout Formulae 9 to 12, $R_4$ and $R_7$ independently denote hydrogen atom, halogens such as fluorine, chlorine, bromine and iodine; a lower alkyl or haloalkyl group with a straight- or branched-chain such as methyl, trifluoromethyl, ethyl, propyl, isopropyl, butyl, isobutyl, sec-butyl, tert-butyl, 1-methylbutyl, 2-methylbutyl, 3-methylbutyl, pentyl, isopentyl, neopentyl, tert-pentyl, hexyl, or isohexyl group; alkoxy or haloalkoxy group such as methoxy, trifluoromethoxy, ethoxy, propoxy, isopropoxy, butoxy, or tert-butoxy group; alkoxycarbonyl or haloalkoxycarbonyl group such as methoxycarbonyl, trifluoromethoxycarbonyl, or ethoxycarbonyl group; or nitro group. Y and Y' identically or differently denote, for example, a hetero atom selected from the 16 group in the periodic law table such as oxygen, sulfur, selenium, and tellurium atoms. M is a central metal and is generally, for example, one selected from metal elements from the 3–12 groups in the periodic law table such as scandium, yttrium, titanium, zirconium, vanadium, niobium, chrome, molybdenum, manganese, technetium, iron, rubidium, cobalt, rhenium, nickel, palladium, copper, silver, zinc, and cadmium.

Throughout Formulae 9 to 10, $R_8$ and $R_9$ identically or differently denote hydrogen atom or, for example, halogens such as fluorine, chlorine, bromine, or iodine; alkyl groups such as methyl, ethyl, propyl, isopropyl, butyl, and tert-butyl group; alkoxy or haloalkoxy groups such as methoxy, trifluoromethoxy, ethoxy, propoxy, isopropoxy, butoxy, and tert-butoxy groups; and aliphatic, alicyclic or aromatic amino groups substituted or unsubstituted, for example, with amino, monomethylamino, dimethylamino, monoethylamino, diethylamino, monopropylamino, dipropylamino, monoisopropylamino, diisopropylamino, monobutylamino, dibutylamino, anilino, o-toluidino, m-toluidino, p-toluidino, xylidino, piperadinyl, piperidino, and pyrrolidino groups; hydroxy group; carboxy group; carbamoyl group; sulfo group; or sulfonamide group. One or more of the hydrogen atoms of these substituted amino, carbamoyl, sulfo, and sulfonamide groups may be replaced with halogens such as fluorine, chlorine, bromine, or iodine; alkyl groups such as methyl, ethyl, propyl, or butyl group; alkoxy or haloalkoxy groups such as methoxy, trifluoromethoxy, ethoxy, or propoxy group; aromatic hydrocarbon groups such as phenyl, biphenyl, o-tolyl, m-tolyl, p-tolyl, o-cumenyl, m-cumenyl, p-cumenyl, xylyl, mesityl, styryl, cinnamoyl, or naphthyl group; or other substituents such as carboxy, hydroxy, cyano, or nitro group.

In Formula 11, $R_{10}$ and $R_{13}$ independently denote hydrogen atom or, for example, a lower alkyl group which may have a straight-chain or branched-chain, for example, of methyl, ethyl, propyl, isopropyl, butyl, isobutyl, sec-butyl, tert-butyl, 1-methylbutyl, 2-methylbutyl, 3-methylbutyl, pentyl, isopentyl, neopentyl, or tert-pentyl group. These alkyl groups may contain one or more substituents and examples of such are halogens such as fluorine, chlorine, bromine, or iodine; alkoxy or haloalkoxy group such as methoxy, trifluoromethoxy, ethoxy, or propoxy group; aromatic hydrocarbon group such as phenyl, biphenyl, o-tolyl, m-tolyl, p-tolyl, o-cumenyl, m-cumenyl, p-cumenyl, xylyl, mesityl, styryl, cinnamoyl, or naphthyl group; or other substituent such as carboxy, hydroxy, cyano, or nitro group.

In Formula 12, A denotes one or more hetero atoms selected from nitrogen, oxygen, selenium, or tellurium atom; or a heterocyclic group with a 5–10 membered ring structure, for example, furyl, thienyl, pyrolyl, pyridyl, piperidinio, piperydil, or quinolyl group. Examples of the heterocyclic group may contain one or more substituents, for example, an alkyl or haloalkyl group with a straight-chain or branched-chain, for example, of methyl, trifluoromethyl, ethyl, propyl, isopropyl, butyl, isobutyl, sec-butyl, tert-butyl, 1-methylbutyl, 2-methylbutyl, 3-methylbutyl, pentyl, isopentyl, neopentyl, or tert-pentyl group; an alkoxycarbonyl or haloalkoxycarbonyl group such as methoxycarbonyl, trifluoromethoxycarbonyl, or ethoxycarbonyl; an aromatic hydrocarbon group such as phenyl, biphenyl, o-tolyl, m-tolyl, p-tolyl, o-cumenyl, m-cumenyl, p-cumenyl, xylyl, mesityl, styryl, cinnamoyl, or naphthyl group; or other substituents such as cyano or nitro group.

Any of the aforesaid organic metal complex anions can be prepared by conventional methods or in accordance therewith. Because the cyanine dyes of the present invention, which contain these anions as the counter ion $X^-$ in Formulae 1 and 2, have in themselves light resistance, they can be freely coated on substrates for optical recording media without considering their solubility when used with light resistant improvers in the form of a liquid or amorphous. Examples of the cyanine dyes, which comprise organic metal complex ions as counter ions according to the present invention, are those represented by Chemical Formulae 3, 16 and 24–26.

The cyanine dyes of the present invention have a satisfactory-high solubility in organic solvents without substantially causing negative problem for actual use, and dot not substantially restrict organic solvents used for coating the cyanine dyes on substrates. Thus, in the preparation of optical recording media according to the present invention, TFP frequently used to prepare optical recording media and the following organic solvents other than TFP can be selected and appropriately used in combination: For example, hydrocarbons such as hexane, cyclohexane, methylcyclohexane, dimethylcyclohexane, ethylcyclohexane, isopropylcyclohexane, tert-butylcyclohexane, octane, cyclooctane, benzene, toluene, and xylene; halogen compounds such as carbon tetrachloride, chloroform, 1,2-dichloroethane, 1,2-dibromoethane, trichloroethylene, tetrachloroethylene, chlorobenzene, bromobenzene, and α-dichlorobenzene; alcohols and phenols such as methanol, ethanol, 2,2,2-trifluoroethanol, 2-methoxyethanol (methyl cellosolve), 2-ethoxyethanol (ethyl cellosolve), 2-isopropoxy-1-ethanol, 1-propanol, 2-propanol, 1-methoxy-2-propanol, 1-ethoxy-2-propanol, 1-butanol, 1-methoxy-2-butanol, 3-methoxy-1-butanol, 4-methoxy-1-butanol, isobutyl alcohol, pentyl alcohol, isopentyl alcohol, cyclohexanol, diethylene glycol, triethylene glycol, propylene glycol, glycerine, diacetone alcohol, phenol, benzyl alcohol, and cresol; ethers such as diethyl ether, diisopropyl ether, tetrahydrofuran, tetrahydropyran, 1,4-dioxane, anisole, 1,2-dimethoxyethane, diethylene glycol dimethyl ether, cyclohexyl-18-crown-6, methyl carbinol, and ethylcarbitol; ketones such as furfural, acetone, 1,3-diacetyl acetone, ethyl methyl ketone, and cyclohexanone; esthers such as ethyl acetate, butyl acetate, ethylene carbonate, propylene carbonate, and trimethyl phosphate; amides such as formamide, N-methyl formamide, N,N-dimethylformamide, and hexamethylphosphoric triamide; nitriles such as acetonitrile, propionitrile, and succinonitrile; nitro compounds such as nitromethane, and nitrobenzene; amides such as ethylene diamine, pyridine, piperidine, morpholine, and N-methylpyrrolidone; and sulfur-containing compounds such as dimethylsulfoxide and sulfolane.

Particularly, since the cyanine dyes of the present invention have a relatively-high solubility in easily-volatile organic solvents such as TFP, methyl cellosolve, ethyl cellosolve, and diacetone alcohol, they are substantially free from dye crystallization when they are successively dissolved in the organic solvents, coated on substrates, and dried; and are free of causing inconsistency of thickness and surface of the formed recording layers. Most of the cyanine dyes of the present invention well dissolve in non-halogen solvents, for example, alcohols such as methyl cellosolve and ethyl cellosolve; and ketones such as diacetone alcohol and cyclohexanone. As the merit, the above alcohols scarcely damage the substrates or spoil the environment when used in dissolving the present cyanine dyes for coating the cyanine dyes on plastics such as polycarbonate.

Commercialized substrates can be used in the present invention, and usually the substrates used in the present invention can be processed with appropriate materials, for example, into discs, 12 cm in diameter and 0.6–1.2 mm in thickness, to suite to final use by the methods such as compression molding, injection molding, compression-injection molding, photopolymerization method (2P method), thermosetting integral method, and lightsetting integral method. Such a disc can be used singularly or plurally after appropriately attaching them each other with adhesives or adhesive sheets, etc. In principal, any materials for substrates can be used in the present invention as long as they are substantially transparent and have a transmittance of at least 80%, and preferably at least 90% through over the wavelength ranging from 400 nm to 800 nm. Examples of such materials are glasses, ceramics, and others such as plastics such as poly(methyl methacrylate), polycarbonate, polystyrene (styrene copolymer), polymethylpenten, polyetherimide, polysulfone, polyethersulfone, polyarylate, polycarbonate/polystyrene alloy, polyestercarbonate, polyphthalatecarbonate, polycarbonateacrylate, non-crystalline polyolefin, methacrylate copolymer, diallylcarbonatediethylene-glycol, and epoxy resin, among which polycarbonate is frequently used. In the case of plastic substrates, concaves for expression of synchronizing signals and addresses of tracks and sectors are usually transferred to the internal circle of the tracks during their formation. The form of concaves are not specifically restricted, and preferably they are formed to give 0.3–0.8 $\mu$m in average wide and 70–200 nm in width.

Considering the viscosity, the light absorbents of the present invention are prepared into 0.5–5 w/w % solutions in the organic solvents as mentioned above, and then uniformly coated over the substrates to form a dried recording layer, 10–1,000 nm, and preferably 50–500 nm in thickness. Prior to the coating of the solutions, preliminary layers can be formed over the substrates to improve the protection and the adhesion ability of the substrates, if necessary. Materials of the preliminary layers are, for example, high-molecular substances such as ionomer resins, polyamide resins, vinyl resins, natural resins, silicon, and liquid rubbers. In the case of using binders, the following polymers can be used alone or in combination in a weight ratio of 0.01–10 times of the cyanine dye(s): Cellulose esters such as nitrocellulose, cellulose phosphate, cellulose sulfate, cellulose acetate, cellulose propionate, cellulose lactate, cellulose palmitate, and cellulose acetate/propionate; cellulose ethers such as methyl cellulose, ethyl cellulose, propyl cellulose, and butyl cellulose; vinyl resins such as polystyrene, poly(vinyl chloride), poly(vinyl acetate), poly(vinyl acetal), poly(vinyl butyral), poly(vinyl formal), poly(vinyl alcohol), and poly(vinyl pyrrolidone); copolymer resins such as styrene-butadiene copolymers, styrene-acrylonitrile copolymers, styrene-butadiene-acrylonitrile copolymers, vinyl chloride-vinyl acetate copolymers, and maleic anhydride copolymers; acrylic resins such as poly(methyl methacrylate), poly (methyl acrylate), polyacrylate, polymethacrylate, polyacrylamide, and polyacrylonitrile; polyesters such as poly(ethylene terephthalate); and polyolefins such as chlorinated polyethylene, and polypropylene.

Explaining the method for using the optical recording media according to the present invention, the high-density optical recording media such as DVD-Rs according to the present invention can write information at a relatively-high density by using a laser beam with a wavelength around 650 nm, and particularly 630–680 nm irradiated by semiconductor lasers such as those of GaN, AlGaInP, GaAsP, GaAlAs, InGaP, InGaAsP or InGaAlP; or YAG lasers combined with second harmonic generation inducing element (SHG element). To read information, laser beams with wavelengths identical to or slightly longer than those used for writing information. As for the laser power for writing and reading information, in the optical recording media of the present invention, it is preferably set to a relatively-high level which exceeds the threshold of the energy required for forming pits when used for writing information, while it is preferably set to a relatively-low level, i.e., a level below the threshold, when used for reading recorded information, although the power levels vary depending on the type and ratio of light-resistant improvers used in combination with the cyanine dyes: Generally, the levels can be controlled to powers at least 5 mW, and usually not higher than 50 mW for writing; and to powers of 0.1–5 mW for reading. The recorded information is read by detecting the changes of both the reflection light level and the transmission light level in the pits and the pit-less part on the surface of optical recording media.

Accordingly, in the present optical recording media, minute pits with a pit width of below 0.834 $\mu$m/pit, usually 0.4 $\mu$m/pit, and a track pitch of below 1.6 $\mu$m, usually 0.74 $\mu$m, that is commonly used in standard CD-R, can be formed smoothly at a relatively-high density by using a light pickup by a laser beam with a wavelength around 650 nm, and particularly 630–680 nm. For example, with a substrate, 12 cm in diameter, it can realize an extremely-high density optical recording medium having an optical recording capacity far exceeding 0.682 GB per one side, usually 4.7 GB per one side, i.e., a recording capacity of about two hours of information of voices and images, which the capacity could not be attained by conventional cyanine dyes easily.

Since the optical recording media of the present invention can record information of characters, images, voices, and other digital data at a relatively-high density, they are extremely useful as recording media for professional and family use to record/backup and keep documents, data, and computer softwares. Particular examples of the kinds of industries and the forms of information to which the optical recording media of the present invention can be applied are as follows: Drawings of constructions and engineering works, maps, ledgers of loads and rivers, aperture cards, architectural sketches, documents of disaster protection, wiring diagrams, arrangement plans, informations of news papers and magazines, local information, blueprints of productions for construction specifications, etc; ingredient tables, prescriptions, product specifications, product price tables, part's lists, information for maintenance, case study files of accidents and troubles, manuals for claims, production schemes, technical documents, sketches, details, company's house-made product files, technical reports, analysis reports, etc; customer's information on sales, . . . , information of companies, contracts, informations of news papers and magazines, business reports, reports of company's credibility, records of stocks, etc; company's information, records of stocks, statistical documents, informations of news papers and magazines, contracts, customer's lists, etc., which all relate to financial; documents of application/notification/licenses/authorization; information of real property and transportations, sketches of constructions, maps, and local information, etc; diagrams of writings and piping arrangements for electric and gas supplies, documents of disaster protection, tables of operation manuals, documents of investigations, technical reports, etc.; medical cartes, files of clinical histories and case studies, diagrams for medical care/institution relationships, etc.; texts, collections of questions, educational documents, statistical information, etc., which are all used in private and preparatory schools; scientific papers, records in academic societies, monthly reports of researches, data of researches, documentary records and indexes thereof, etc., which are all used in universities, colleges, and research institutes; inspection data, literatures, patent publications, weather maps, analytical records of data, customer's files, which are all used in universities, colleges, research institutions, etc; case studies on laws; membership lists, history notes, records of works/products, competition data, data of meetings/congresses, etc., which are used in organizations/associations; sightseeing information and traffic information, etc., which are all used for sightseeing; indexes of homemade publications, information of news papers and magazines, who's who files, sport records, telop files, scripts for broadcastings, etc., which are all used in mass communications and publishers; and maps, ledgers of roads and livers, fingerprint files , resident cards, documents of application/notification/license/authorization, statistical documents, and public documents, which are all used in government offices. Particularly, the write-once type optical recording media of the present invention can be advantageously useful for storing records of cartes and official documents which must not be deleted or rewritten intentionally, and used as electric libraries for art galleries, libraries, museums, broadcasting stations, etc.

As a rather specific use, the optical recording media of the present invention can be used to edit or prepare compact discs, digital video discs, laser discs, MD (a mini disc as information recording system using photomagnetic disc), CDV (a laser disc using compact disc), DAT (an information recording system using a magnetic tape), CD-ROM (a read-only memory using compact disc), DVD-ROM (a read-only memory using digital video disc), DVD-RAM (a writable and readable memory using digital video disc), digital photos, movies, video softwares, audio softwares, computer graphics, publishing products, broadcasting programs, commercial messages, game softwares, etc.; and used as external program recording means for large size of computers and car navigation systems.

Hereinbefore described are the application examples of the cyanine dyes of the present invention to organic ablation type optical recording media which use a laser beam with a wavelength around 650 nm as a writing light. However, in the field of optical recording media, the cyanine dyes of the present invention can be also advantageously used as materials for controlling or calibrating the optical absorption rate or optical reflection rate in the optical recording media such as high-density optical recording media and other commonly used CD-R by using in combination, for example, with one or more other organic dye compounds which are sensitive to a laser beam with a wavelength of 775–795 nm. When ablation type organic optical recording media are coated by using a laser beam with a wavelength around 650 nm as a writing light, the cyanine dyes of the present invention can be used not to directly form pits on substrates but used to indirectly form pits in such a manner that an excitation energy by a laser beam with a wavelength around 650 nm is allowed to transfer to the aforesaid organic dye compounds via the cyanine dyes by combining with one or more other organic dye compounds which are sensitive to a light with a longer wavelength, e.g., a laser beam with a longer wavelength of 775–795 nm, resulting in a decomposition of the organic dye compounds. The optical recording media as referred to in the present invention mean optical recording media in general which use the characteristics of the cyanine dyes of the present invention that substantially absorb a visible light with a wavelength around 650 nm. In addition to organic ablation type optical recording media, thermal coloration method using the chemical reaction of coloring agents and developers using the heat that is generated when organic dye compounds absorb light. The technique is called "moth-eye type technique" which uses the phenomenon of that the above heat smooths the pattern of periodical unevenness provided on the surface of the substrates.

Since the cyanine dyes of the present invention substantially absorb a visible light with a wavelength around 650 nm, the light absorbents containing the cyanine dyes according to the present invention can be used in the aforesaid optical recording media and also used as materials for polymerizing polymerizable compounds by exposing to a visible light, and those for polymerizing solar batteries and dying clothes, as well as for laser active substances in dye lasers. If necessary, in combination with one or more other light absorbents capable of absorbing light in ultraviolet, visible and/or infrared regions, the light absorbents can be used in clothes in general and others including building/bedding/decorating products such as a drape, lace, casement, print, venetian blind, roll screen, shutter, shop curtain, blanket, thick bedquilt including comforter, peripheral material for the thick bedquilt, cover for the thick bedquilt, cotton for the thick bedquilt, bed sheet, cushion, pillow, pillow cover, cushion, mat, carpet, sleeping bag, tent, interior finish for car, and window glasses including car window glass; sanitary and health goods such as a paper diaper, diaper cover, eyeglasses, monocle, and lorgnette; internal base sheets, linings, and materials for shoes; wrappers; materials for umbrellas; parasols; stuffed toys; lighting devices; filters, panels and screens for information displaying devices such as television receivers and personal computers which use cathode-ray tubes, liquid crystal displays, electrolytic luminous displays, and plasma displays; sunglasses; sunroofs; sun visors; pet bottles; refrigerators; vinyl houses; lawns; optical fibers; prepaid cards; and peeping windows of electric ovens and other types of ovens. When used as wrapping materials, injection materials, and vessels for the above products, the light absorbents of the present invention prevent living bodies and products from troubles and discomforts caused by environmental light such as natural and artificial lights or even lower the troubles and discomforts, and furthermore they can advantageously regulate the color, tint, and appearance and adjust the light reflected from or passed through the products to a desired color balance.

The following examples describe the preferred embodiments of the present invention:

EXAMPLE 1

Cyanine Dye

Twenty-five milliliters of acetic anhydride was placed in a reaction vessel, mixed with 4.0 g of the compound represented by Chemical Formula 29, i.e., 1-ethyl-2,3,3-trimethyl-5-nitro-3H-indolium=p-toluenesulfonate, and 5.1 g of the compound represented by Chemical Formula 30, i.e., 1-ethyl-2-(anilinovinyl)-3,3-dimethyl-3H-benzo[e]indolium=p-toluenesulfonate, and further admixed with two milliliters of pyridine under stirring conditions. The resulting mixture was reacted for three hours while the vessel was heating in an oil bath controlled to 150° C. Thereafter, the reaction mixture was cooled to ambient temperature, admixed with 150 ml isopropyl ether, shaken, and slanted to remove a supernatant. The resulting oily residue was dissolved by heating in 50 ml methanol and admixed with 2.0 g sodium perchlorate monohydrate which had been previously dissolved in six milliliters of purified water. The mixture was reacted by heating at 60° C. for about 30 min under stirring conditions and then cooled to ambient temperature.

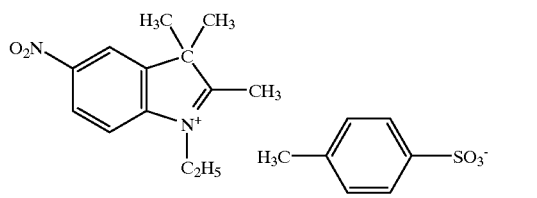

Chemical Formula 29

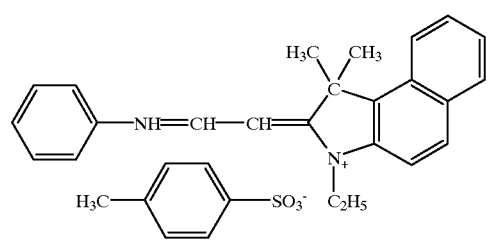

Chemical Formula 30

After the reaction, the resulting crystallized crude crystal was collected by filtration by means of suction, washed with methanol, and dissolved by heating in 20-fold volumes of N,N-dimethylformamide. The solution was filtered, and the filtrate was mixed with an exc essive amount of methanol. The newly formed crystal was collected by filtration by means of suction, washed with methanol, and dried to obtain 1.4 g of a green-colored powdery crystal of cyanine dye represented by Chemical Formula 4.

A part of the crystal was placed in a container, subjected to "MODEL JNM-AL300FT", a 300 MHz $^1$H-nuclear magnetic resonance spectrometer, JEOL Ltd., Tokyo, Japan, for measurement of $^1$H-nuclear magnetic resonance spectrum in chloroform deuteride, and resulted in a chemical shift δ (ppm, TMS) at peaks of 1.48 (3H, t, J=7.2 Hz, $CH_3$—), 1.60 (3H, t, J=7.2 Hz, $CH_3$—), 1.80 (6H, s, $CH_3$—), 2.04 (6H, s, $CH_3$—), 4.20 (2H, q, J=7.2 Hz, —$CH_2$—), 4.50 (2H, q, J=7.2 Hz, —CH—), 6.93 (1H, d, J=13.2 Hz, —CH=), 7.09 (1H, d, J=8.7 Hz, ArH), 7.18 (1H, d, J=13.2 Hz, —CH=), 7.50 (1H, d, J=9.0 Hz, ArH), 7.57 (1H, dd, $J_1$=8.7 Hz, $J_2$=5.4 Hz, ArH), 7.68 (1H, dd, $J_1$=8.7 Hz, $J_2$=5.4 Hz, ArH), 8.01 (1H, d, J=8.7 Hz, ArH), 8.03 (1H, d, J=8.7 Hz, ArH), 8.14 (1H, d, J=8.7 Hz, ArH), 8.19 (1H, d, J=2.1 Hz, ArH), 8.33 (1H, dd, $J_1$=9.0 Hz, $J_2$=2.1 Hz, ArH), and 8.53 (1H, t, J=13.2 Hz, —CH=).

EXAMPLE 2

Cyanine Dye

A green-colored powdery crystal of cyanine dye represented by Chemical Formula 1 was obtained similarly as in Example 1 except for replacing the compounds represented by Chemical Formulae 29 and 30 with 1,2,3,3-tetramethyl-5-nitro-3H-indolium=p-toluenesulfonate and 2-(2-anilinovinyl)-1,3,3-trimethyl-3H-benzo[e]indolium=p-toluenesulfonate.

EXAMPLE 3

Cyanine Dye

A green-colored powdery crystal of cyanine dye represented by Chemical Formula 6 was obtained similarly as in Example 1 except for replacing the compounds represented by Chemical Formulae 29 and 30 with 1-propyl-2,3,3-trimethyl-5-nitro-3H-indolium=p-toluenesulfonate and 1-propyl-2-(2-anilinovinyl)-3,3-dimethyl-3H-benzo[e]indolium=p-toluenesulfonate.

EXAMPLE 4

Cyanine Dye

A green-colored powdery crystal of cyanine dye represented by Chemical Formula 7 was obtained similarly as in Example 1 except for replacing the compounds represented by Chemical Formulae 29 and 30 with 1-propyl-2,3,3-trimethyl-5-nitro-3H-indolium=p-toluenesulfonate and 1-butyl-2-(2-anilinovinyl)-3,3-dimethyl-3H-benzo[e]indolium=p-toluenesulfonate.

EXAMPLE 5

Cyanine Dye

A green-colored powdery crystal of cyanine dye represented by Chemical Formula 8 was obtained similarly as in Example 1 except for replacing the compounds represented by Chemical Formulae 29 and 30 with 1-butyl-2,3,3-trimethyl-5-nitroindolium=p-toluenesulfonate and l-butyl-3,3-dimethyl-2-(2-anilinovinyl)benzo[e]indolium=p-toluenesulfonate.

EXAMPLE 6

Cyanine Dye

Three hundred milliliters of ethanol were placed in a reaction vessel, and then admixed with 3.0 g of the cyanine dye represented by Chemical Formula 2 of the present invention, 3.0 g of an azo organic metal complex represented by Chemical Formula 31 having light resistance-improving action, followed by stirring under heating conditions to obtain 3.0 g of a dark green-colored crystal of the cyanine dye of the present invention, represented by Chemical Formula 3 and having a metal complex anion as a counter ion.

Chemical Formula 31

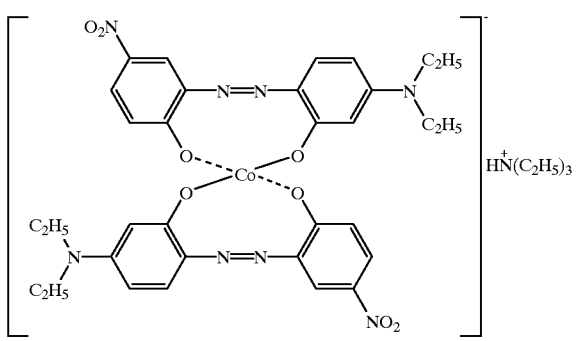

EXAMPLE 7

Cyanine Dye

Two hundred milliliters of acetonitrile were placed in a reaction vessel, and then admixed with 1.0 g of the cyanine dye represented by Chemical Formula 22 of the present invention, 0.9 g of an azo organic metal complex represented by Chemical Formula 33 having light resistance-improving action, followed by stirring under heating conditions to obtain 1.0 g of a dark green-colored crystal of the cyanine dye of the present invention, represented by Chemical Formula 26 and having a metal complex anion as a counter ion.

Chemical Formula 32

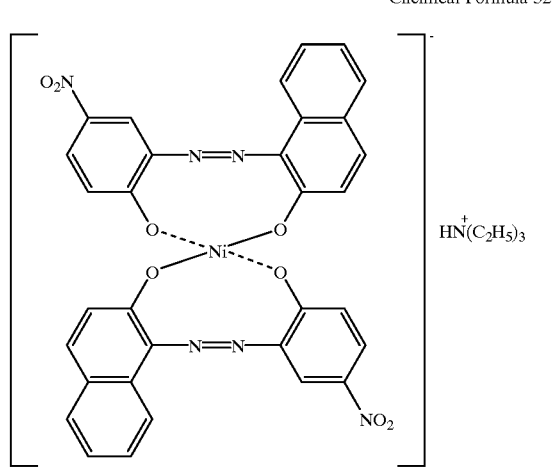

Although the production conditions and yields are varied in some degrees depending on the structures of the cyanine dyes of the present invention, all the cyanine dyes of the present invention, including the compounds represented by Chemical Formulae 1 to 28, can be produced by the methods in Examples 1 to 7 or in accordance therewith.

EXAMPLE 8

Light Characteristics of Cyanine Dye

The cyanine dyes as listed in Table 1 of the present invention and known compounds represented by Chemical Formulae 33 and 34 as controls were measured for visible absorption spectrum when dissolved in methanol and formed into layers over glasses. The maximum absorption spectra in each conditions are tabulated in Table 1. In FIG. 1, the solid line shows the visible absorption spectrum for the cyanine dye represented by Chemical Formula 4 of the present invention in a thin layer, and the broken line shows the visible absorption spectrum of the known compounds represented by Chemical Formulae 33 and 34, which are known as related compounds and reported about their usefulness in optical recording media.

Chemical Formula 33

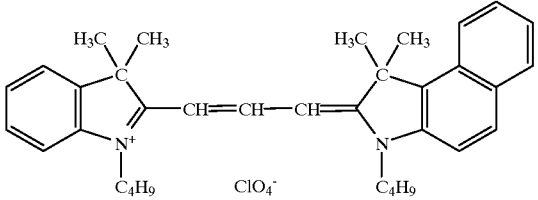

Chemical Formula 34

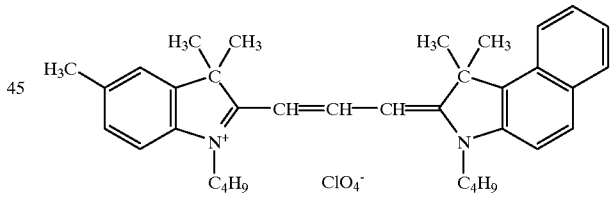

TABLE 1

| Cyanine dye | Maximum absorption (nm) $CH_3OH$ | Maximum absorption (nm) Thin Layer | Melting point (° C.) | Decomposition point (° C.) | Solubility (mg/ml) | Remarks |
| --- | --- | --- | --- | --- | --- | --- |
| Chemical Formula 1 | 573 | 609 | * | 297.4 | 36 | Present invention |
| Chemical Formula 3 | 540 | 557 | * | 271.3 | 22 | Present invention |
| Chemical Formula 4 | 576 | 609 | * | 297.5 | 126 | Present invention |
| Chemical Formula 6 | 578 | 609 | * | 279.7 | 164 | Present invention |
| Chemical Formula 7 | 577 | 609 | * | 261.2 | 210 | Present invention |
| Chemical Formula 8 | 577 | 609 | 168–170 | 262.4 | 245 | Present invention |
| Chemical Formula 15 | 562 | 617 | * | 270.7 | 229 | Present invention |
| Chemical Formula 16 | 564 | 578 | 238.3 | 266.5 | 134 | Present invention |
| Chemical Formula 23 | 591 | 591 | 251–253 | 273.5 | >200 | Present invention |
| Chemical Formula 24 | 538 | 556 | * | 289.1 | 197 | Present invention |

TABLE 1-continued

| Cyanine dye | Maximum absorption (nm) | | Melting point (° C.) | Decomposition point (° C.) | Solubility (mg/ml) | Remarks |
| --- | --- | --- | --- | --- | --- | --- |
| | $CH_3OH$ | Thin Layer | | | | |
| Chemical Formula 26 | 570 | 594 | 218 | 257.3 | 127 | Present invention |
| Chemical Formula 27 | 571 | 592 | * | 297.2 | >200 | Present invention |
| Chemical Formula 33 | 568 | 600 | 156–160 | 268.1 | — | Control |
| Chemical Formula 34 | 574 | 599 | 219–222 | 267 | — | Control |

Note: The symbol "*" means that it has no melting point or the melting point is quite close to the decomposition point.

The maximum absorption wavelengths in Table 1 and the visible absorption spectra in FIG. 1 show that, similarly as in conventional related compounds, the cyanine dyes of the present invention have absorption maxima in the visible region and substantially absorb a visible light with a wavelength around 650 nm when in a thin layer form. Among the tested cyanine dyes of the present invention, as shown in Table 1 and FIG. 1, those represented by Chemical Formulae 1, 4, 6, 7, 8 and 15 shifted their absorption maxima to longer wavelengths by a large margin as compared with conventional related compounds, i.e., they showed significantly high absorbances at wavelengths around 650 nm. The data indicate that the cyanine dyes of the present invention have satisfactory light-characteristics equal or superior to those of conventional related compounds.

EXAMPLE 9
Solubility of Cyanine Dye

For the cyanine dyes in Table 1, they were measured for solubility in TFP at 20° C. The results are also shown in Table 1.

As found in the results in Table 1, all of the cyanine dyes measured had solubility of over 20 mg/ml in TFP, and except for the compounds represented by Chemical Formulae 1 and 3, other cyanine dyes had a greatly-high level of solubility up to over 100 mg/ml. When coating over the substrates for optical recording media, the cyanine dyes are generally prepared into 0.1–10 w/w % solutions. The fact that the cyanine dyes of the present invention exhibited such a high level solubility in TFP used frequently in the preparation of optical recording media shows that the use of the cyanine dyes can greatly increase the working efficiency for coating light absorbents on the surface of the substrates.

EXAMPLE 10
Decomposition Point of Cyanine Dye

Figure 2:
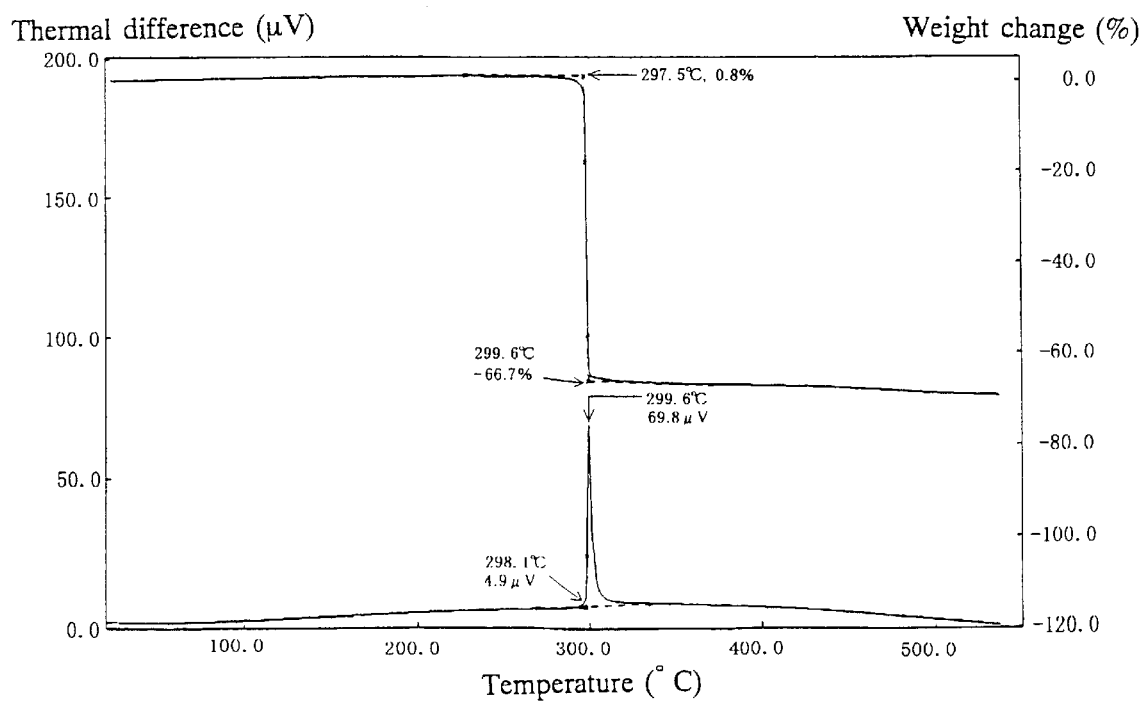
FIG. 2 shows the results on DTA and TGA for the cyanine dye of the present invention.
Figure 3:
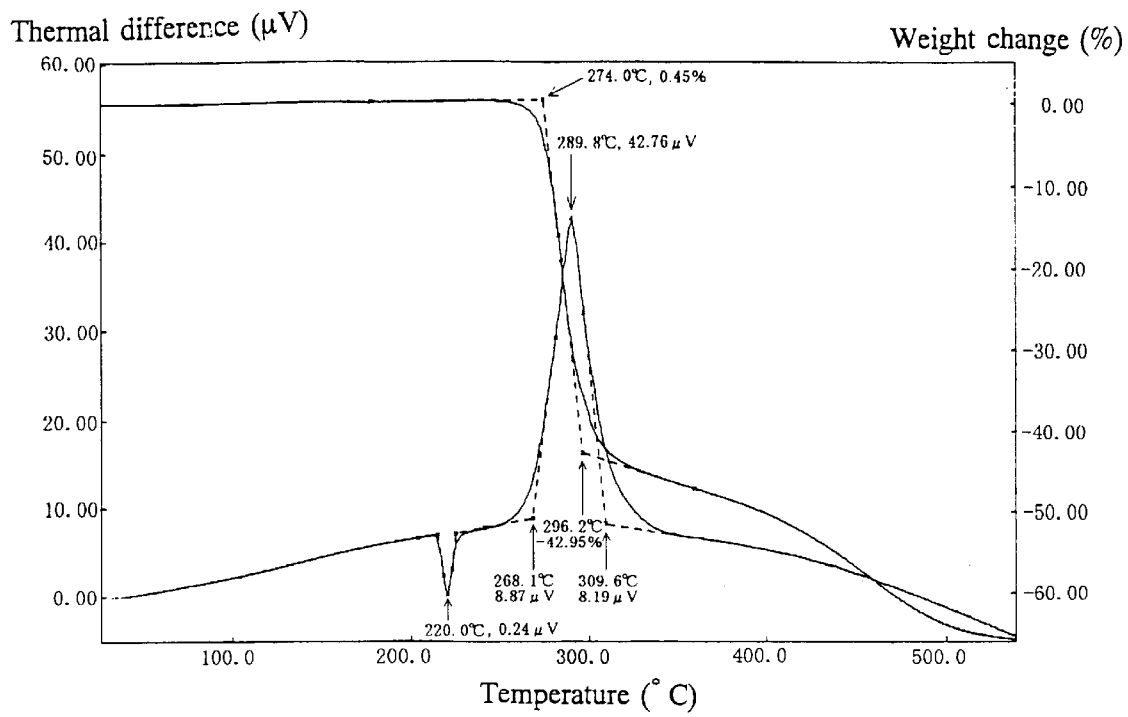
FIG. 3 shows the results on DTA and TGA for a conventional related compound.

An adequate amount of either of the cyanine dyes in Table 1 as a test specimen was placed in a vessel and subjected to conventional differential thermal analysis (hereinafter abbreviated as "DTA") and thermogravimetric analysis (hereinafter abbreviated as "TGA") using "MODEL TG/DTA 220", a digital thermo analyzer commercialized by Seiko Instruments Inc., Tokyo, Japan, to determine the melting point, i.e., a temperature at which the cyanine dyes as test specimens begin to absorb heat on TGA, and to determine the decomposition point, i.e., a temperature at which the cyanine dyes as test specimens begin to lose weight on DTA. In parallel, conventional related compounds represented by Chemical Formulae 33 and 34 were analyzed similarly as above. The results are also shown in Table 1. FIGS. 2 and 3 are respectively the results of the cyanine dye represented by Chemical Formula 4 of the present invention and conventional related compound represented by Chemical Formula 34. In DTA and TGA, the environmental temperature was set to an increasing temperature mode at a rate of 10° C./min.

As evident from Table 1 and FIGS. 2 and 3, all the conventional related compounds had melting points and decomposition points which were different from each other, and very slowly decomposed at temperatures around their decomposition points. While all the tested cyanine dyes of the present invention promptly decomposed at temperatures around their decomposition points, particularly, the cyanine dyes represented by Chemical Formulae 1 and 4 exhibited decomposability as if they instantly decomposed at once when reaching to their decomposition points. The cyanine dyes represented by Chemical Formulae 1, 4, 6, 24 and 27 had extremely high decomposition points, and particularly those represented by Chemical Formulae 1, 4 and 27 had extremely high decomposition points as high as reaching up to about 300° C. Most specifically, conventional known compounds had both melting points and decomposition points which were different from each other, i.e., the difference ranged from 17 to 108° C., while most of the cyanine dyes of the present invention had decomposition points which were undistinguishable from their melting points or had only the decomposition points. These results indicate that the cyanine dyes of the present invention do exceed conventional related compounds. Among the cyanine dyes represented by Chemical Formulae 1, 4 and 6 to 8, those represented by Chemical Formulae 1, 4, 6 and 7 decomposed most rapidly, indicating that preferable cyanine dyes are those represented by Formula 1 or 2 which bind $R_2$ and $R_3$ that are preferably alkyl groups, and more particularly methyl/ethyl groups, represented by $C_mH_{2m+1}$ and $C_nH_{2n+1}$, where n and m are natural numbers and counted not more than seven in total.

EXAMPLE 11
Descomposition Rate of Cyanine Dye

Figure 4:
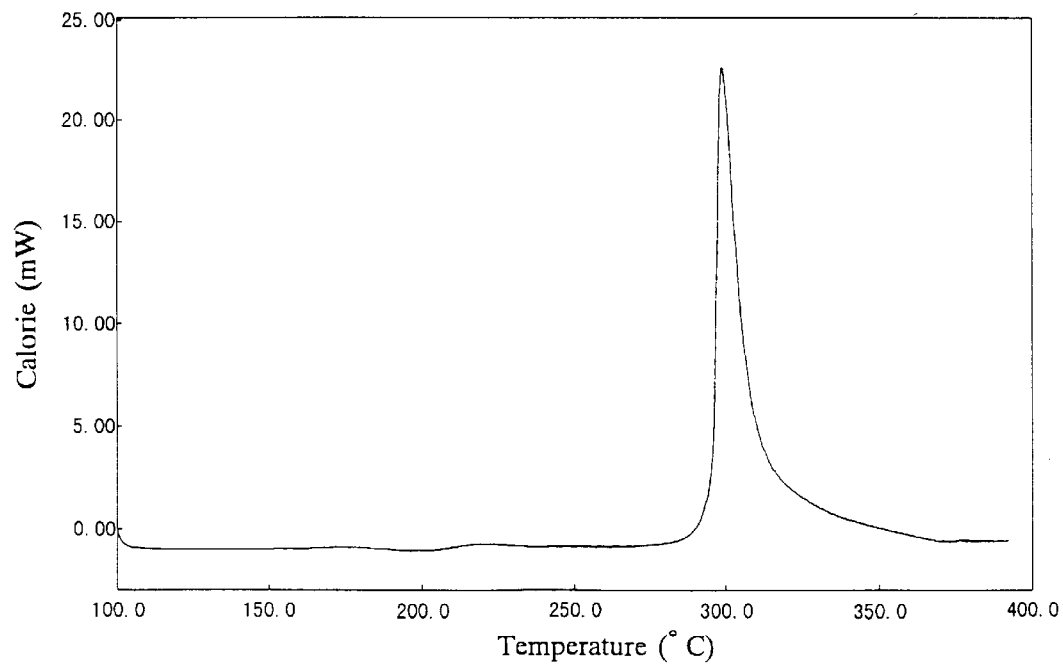
FIG. 4 is a figure of differential calorimetric curve of the cyanine dye of the present invention.
Figure 5:
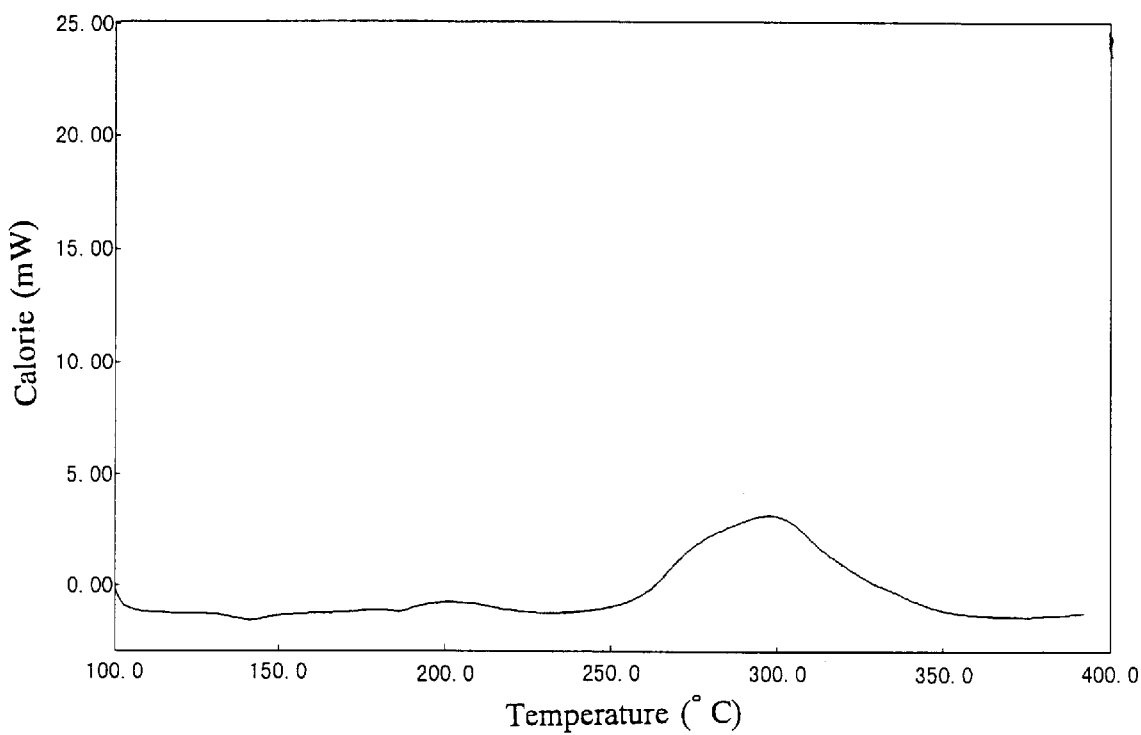
FIG. 5 is a figure of differential calorimetric curve of a conventional related compound.

For the cyanine dyes represented by Chemical Formulae 4, 6 and 8 of the present invention, they were in a usual manner examined for differential calorimetric curve when heated under an increasing temperature rate of 10° C./min and nitrogen atmospheric conditions using "MODEL DSC220U", a digital thermo analyzer commercialized by Seiko Instruments Inc., Tokyo, Japan. In parallel, conventional cyanine dye represented by Chemical Formula 33 was examined for differential calorimetric curve similarly as above. FIGS. 4 and 5 are respectively differential calorimetric curves for the cyanine dyes represented by Chemical Formulae 4 and 33.

Based on the results of the differential calorimetric curves, the half calorific vallues at descomposition peaks for each cyanine dyes were determined, and the thermal difference between the two points, having the determined half calorific values at both ends of each descomposition peaks (hereinafter designated as "a half value width"), was determined.

TABLE 2

| Cyanine dye | Decomposition initiating point | Decomposition peak point | Calorific value | Half value width | Remarks |
| --- | --- | --- | --- | --- | --- |
| Chemical Formula 4 | 295.8° C. | 298.6° C. | 1826 mJ/mg | 7.7° C. | Present invention |
| Chemical Formula 6 | 279.5° C. | 285.5° C. | 1827 mJ/mg | 13.2° C. | Present invention |
| Chemical Formula 8 | 249.9° C. | 273.5° C. | 1663 mJ/mg | 32.2° C. | Present invention |
| Chemical Formula 33 | 255.4° C. | 297.4° C. | 1467 mJ/mg | 49.9° C. | Control |

As evident from the results in Table 2 and FIGS. 4 and 5, the cyanine dyes of the present invention instantly and promptly decomposed in spite of their substantially the same calorific-values as compared with conventional one. In view of the half value width, those of the cyanine dyes of the present invention decreased to a level of ⅔ or lower of that of conventional cyanine dye; the cyanine dye represented by Chemical Formula 4 decreased to a level of ⅙ or lower of that of conventional one. Similarly as in conventional related compounds represented by Formulae 33 and 34, dyes with a relatively-slow decomposition rate are substantially difficult to form stable minute pits at a relatively-high density on a restricted recording surface of high-density optical recording media such as DVD-Rs, as mentioned above. Varying depending on glass transition temperature of substrate, when used as a light absorbent in optical recording media, dyes with a lower decomposition point can be generally used to write information by using a lower-power laser beam as a merit, however, as a demerit, when exposed to laser beam for a relatively-long period of time on reading, the dyes tend to accumulate heat and deform parts around pits and other parts free of pit on recording surfaces, resulting in large jitters and reading errors. The cyanine dyes of the present invention substantially absorb a visible light with a wavelength around 650 nm when formed into a thin layer, have decomposition points which are undistinguishable from their melting points or only have the decomposition points of relatively-high temperatures, and have an outstandingly-high decomposition rate at around the decomposition points. These characteristics mean that high-density optical recording media, having a relatively-small jitter, insubstantial reading error, and satisfactory stability of exposure to environmental light such as reading light and natural light, can be obtained by using the cyanine dyes of the present invention as light absorbents. The reason of why the half value width was employed as an index for the decomposability in this example was due to the fact that it can effectively evaluate the decomposition rate of test specimens.

EXAMPLE 12
Optical Recording Medium

The cyanine dye represented by Formula 1, 4, 6, 7, 8, 15, 23 or 27 and a conventional cyanine dye represented by Chemical Formula 35 were added to TFP to give a respective concentration of 2 w/w %, and the mixture was mixed with, as a light resistant improver, a nitroso compound with a phenylpyridylamine skeleton represented by Chemical Formula 36, as disclosed in Japanese Patent Application No. 88,983/99, titled "Phenylpyridylamine derivative", applied for by the same applicant as the present invention, in an amount of ⅛ of the cyanine dyes by weight, followed by ultrasonically dissolving the contents. The resulting solution was in a usual manner homogeneously coated in a rotatory manner over one side of a polycarbonate disc substrate, 12 cm in diameter, to which concaves for expressing synchronizing signals and addresses of tracks and sectors had been transferred to the track's internal circuit, and dried to form a recording layer, 120 nm in thickness. Thereafter, the substrate was spattered with gold to form a reflection layer, 100 nm in thickness, to be closely attached on the surface of the recording layer, and the reflection layer was homogeneously coated in a rotatory manner with "DAICURE CLEAR SD1700", as a known ultraviolet ray hardening resin commercialized by Dainippon Ink and Chemicals, Inc., Tokyo, Japan, and irradiated to form a protection layer to be closely attached on the surface of the reflection layer, followed by closely attaching and sticking a polycarbonate disc protection plate on the surface of the protection layer to obtain eight types of optical recording media.

Chemical Formula 35

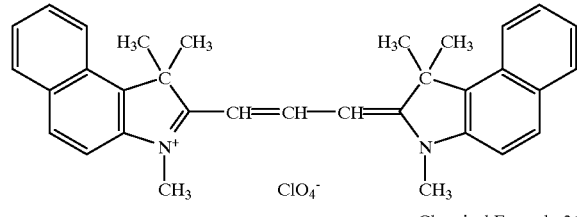

Chemical Formula 36

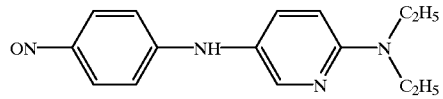

The optical recording media thus obtained have a recording capacity of over 4 GB and can write large amounts of information of documents, images, voices, and digitals at a relatively-high density by using laser elements with an oscillation wavelength around 650 nm. Microscopic observation of the recorded surface of the optical recording medium of this example, which had been written information by a semiconductor laser element with an oscillation wavelength of 658 nm, revealed that minute pits with a size of less than one μm/pit were formed at a track pitch of below one μm.

EXAMPLE 13
Optical Recording Medium

The cyanine dye represented by Chemical Formula 3, 16, 24 or 26 was added to TFP to give a respective concentration of 2 w/w %, and ultrasonically dissolved. The resulting solution was in a usual manner homogeneously coated in a rotatory manner over one side of a polycarbonate disc substrate, 12 cm in diameter, to which concaves for expressing synchronizing signals and addresses of tracks and sectors had been transferred to the track's internal circuit, and dried to form a recording layer, 120 nm in thickness. Thereafter, the substrate was spattered with gold to form a reflection layer, 100 nm in thickness, to be closely attached on the surface of the recording layer, and the reflection layer was homogeneously coated in a rotatory manner with "DAI-CURE CLEAR SD1700", as a known ultraviolet ray hardening resin commercialized by Dainippon Ink and Chemicals, Inc., Tokyo, Japan, and irradiated to form a protection layer to be closely attached on the surface of the reflection layer, followed by closely attaching and sticking a polycarbonate disc protection plate on the surface of the protection layer to obtain eight types of optical recording media.

The optical recording media thus obtained have a recording capacity of over 4 GB and can write large amounts of information of documents, images, voices, and digitals at a relatively-high density by using laser elements with an oscillation wavelength around 650 nm. Microscopic observation of the recorded surface of the optical recording medium of this example, which had been written information by a semiconductor laser element with an oscillation wavelength of 658 nm, revealed that minute pits with a size of less than one µm/pit were formed at a track pitch of below one µm.

POSSIBILITY OF INDUSTRIAL APPLICABILITY

As described above, the present invention was made based on the establishment of novel non-symmetric trimethyl cyanine dyes and their industrially usable characteristics. The cyanine dyes have absorption maxima in the visible region, substantially absorb a visible light with a wavelength around 650 nm when in a thin layer form. The dyes have only decomposition points or decomposition points undistinguishable from their melting points, have relatively-higher decomposition points, higher heat resistance, and promptly decompose at temperatures around the decomposition points. Accordingly, the cyanine dyes of the present invention can be advantageously used as light absorbents in high-density optical recording media in the form of a DVD-R in which stable minute pits at a relatively-high density should be promptly formed on a restricted recording surface by using, as a reading light, a laser beam with a wavelength around 650 nm when writing information.

Comparing with CD-R now used in this field, the organic hole making type optical recording media of the present invention, which write information by using a laser beam with a wavelength around 650 nm, can form more minute pits at a narrower track pitch, and this results in advantageous characteristics that they can record extremely-large amount of information of characters, images, voices and other digital information at a relatively-high density. Thus, the cost per a bit required for recording information can be beneficially lowered by a large margin.

The cyanine dyes of the present invention with such usefulness can be obtained in a desired yield through a step of reacting 3,3-dimethyl-5-nitroindolium compounds or 3,3-dimethyl-5-sulfonamideindolium compounds, which have a reactive methyl group or an adequate leaving group, with 3,3-dimethylbenzoindolium compounds having a reactive methyl group of an adequate leaving group.

The present invention having such outstanding effects and functions is a significant invention that will greatly contribute to this art.

What is claimed is:
1. A non-symmetric trimethine cyanine dye represented by Formula 1:

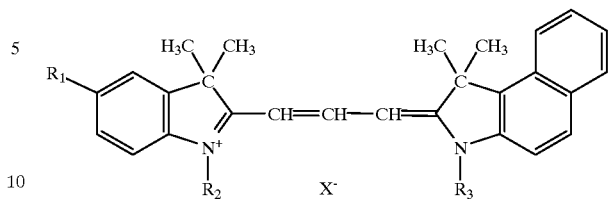

Formula 1

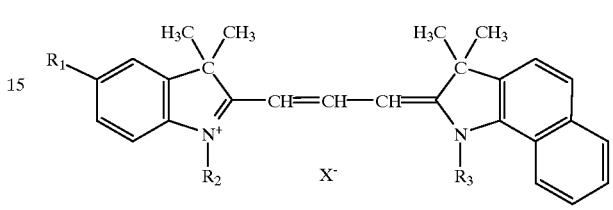

Formula 2 wherein Formulae 1 and 2, $R_1$ denotes a nitro group or a sulfonamide group which may have a substituent; $R_2$ and $R_3$ independently denote an alkenyl group, aralkyl group, or straight- or branched-chain of alkyl group, which all may have a substituent; $X^-$ denotes a counter ion; and $R_2$ and $R_3$ have no $X^-$ when either or both of them have a negatively charged substituent that forms an internal salt.

2. The non-symmetric trimethine cyanine dye of claim 1, wherein said $R_2$ and $R_3$ are respectively alkyl groups represented by $C_mH_{2m+1}$ and $C_nH_{2n+1}$, where n and m are natural numbers and counted not more than seven in total.

3. The non-symmetric trimethine cyanine dye of claim 1 or 2, wherein said $X^-$ is an organic metal complex anion capable of improving light resistance.

4. The non-symmetric trimethine cyanine dye of claim 1, which substantially absorbs a visible light with a wavelength of about 650 nm when in a thin layer form.

5. The non-symmetric trimethine cyanine dye of claim 1, which has only a decomposition point or a decomposition point undistinguishable from its melting point.

6. The non-symmetric trimethine cyanine dye of claim 1, which has a decomposition point of over 260° C.

7. A non-symmetric trimethine cyanine dye, which substantially absorbs a visible light with a wavelength of about 650 nm when in a thin layer form, and has only a decomposition point or a decomposition point undistinguishable from its melting point.

8. The non-symmetric trimethine cyanine dye of claim 7, which has a decomposition point of over 260° C.

9. The non-symmetric trimethine cyanine dye of claim 7 represented by Formula 1 or 2:

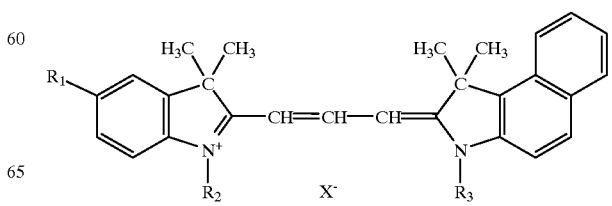

Formula 1

Formula 2

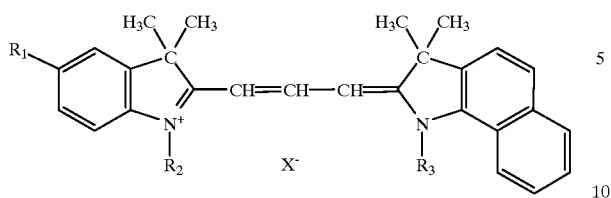

wherein Formulae 1 and 2, $R_1$ denotes a nitro group or a sulfonamide group which may have a substituent; $R_2$ and $R_3$ independently denote an alkenyl group, aralkyl group, or straight- or branched-chain of alkyl group, which all may have a substituent; $X^-$ denotes a counter ion; and $R_2$ and $R_3$ have no $X^-$ when either or both of them have a negatively charged substituent that forms an internal salt.

10. The non-symmetric trimethine cyanine dye of claim 9, wherein said $R_2$ and $R_3$ are respectively alkyl groups represented by $C_mH_{2m+1}$ and $C_nH_{2n+1}$, where n and m are natural numbers and counted not more than seven in total.

11. The non-symmetric trimethine cyanine dye of claim 10, wherein said $X^-$ is an organic metal complex anion capable of improving light resistance.

12. A light absorbent comprising the non-symmetric trimethine cyanine of claim 1.

13. The light absorbent of claim 12, which further comprises one or more other organic dye compound that is sensitive to a visible light.

14. The light absorbent of claim 12, which is sensitive to a laser beam with a wavelength of about 650 nm when in a thin layer form.

15. An optical recording medium comprising the non-symmetric trimethine cyanine dye of claim 1.

16. The optical recording medium of claim 15, which contains a recording layer comprising the non-symmetric trimethine cyanine dye of claim 1, and one or more other organic dye compound that is sensitive to a visible light.

17. The optical recording medium of claim 15, wherein said recording layer further contains an adequate light resistant improver.

18. The optical recording medium of claim 15, which uses a laser beam with a wavelength around 650 nm as a light for writing.

19. A process for producing the non-symmetric trimethine cyanine dye of claim 9 through a step of reacting a compound, represented by Formula 3 having $R_1$ and $R_2$ as shown in Formulae 1 and 2, with a compound represented by Formula 4 or 5 having $R_3$ as shown in Formula 1 or 2:

Formula 3

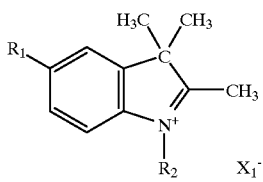

Formula 4

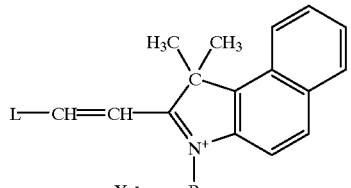

Formula 5

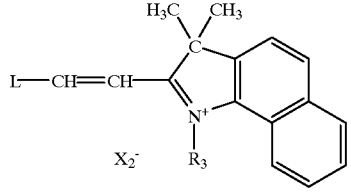

wherein Formulae 3 to 5, $X_1^-$ and $X_2^-$ denote an appropriate counter ion, respectively; and L denotes an appropriate leaving group.

20. A process for producing the non-symmetric trimethine cyanine dye of claim 9 through a step of reacting a compound, represented by Formula 6 having $R_1$ and $R_2$ as shown in Formula 1 or 2, with a compound represented by Formula 7 or 8 having $R_3$ as shown in Formula 1 or 2:

Formula 6

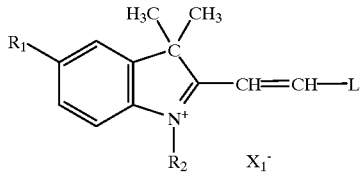

Formula 7

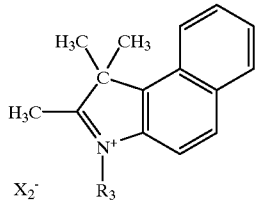

Formula 8

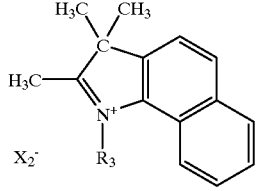

wherein Formulae 6 to 8, $X_1^-$ and $X_2^-$ denote an appropriate counter ion, respectively; and L denotes an appropriate leaving group.

21. The light absorbent of claim 13, which is sensitive to a laser beam with a wavelength of about 650 nm when in a thin layer form.

22. The optical recording medium of claim 16, wherein said recording layer further contains an adequate light resistant improver.

23. The optical recording medium of claim 22, which uses a laser beam with a wavelength around 650 nm as a light for writing.

* * * * *

UNITED STATES PATENT AND TRADEMARK OFFICE
CERTIFICATE OF CORRECTION

PATENT NO.    : 6,413,607 B1
DATED         : July 2, 2002
INVENTOR(S)   : Chiaki Kasada et al.

It is certified that error appears in the above-identified patent and that said Letters Patent is hereby corrected as shown below:

Column 31,
Line 67, after "1" insert -- or 2 --.

Signed and Sealed this

Seventeenth Day of December, 2002

JAMES E. ROGAN
*Director of the United States Patent and Trademark Office*